United States Patent
Wolman et al.

(10) Patent No.: US 12,143,861 B2
(45) Date of Patent: Nov. 12, 2024

(54) EFFICIENCY OF ROUTING TRAFFIC TO AN EDGE COMPUTE SERVER AT THE FAR EDGE OF A CELLULAR NETWORK

(71) Applicant: Microsoft Technology Licensing, LLC, Redmond, WA (US)

(72) Inventors: Alastair Wolman, Seattle, WA (US); Paramvir Bahl, Bellevue, WA (US); Landon Prentice Cox, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 195 days.

(21) Appl. No.: 17/500,441

(22) Filed: Oct. 13, 2021

(65) Prior Publication Data

US 2023/0110752 A1    Apr. 13, 2023

(51) Int. Cl.
*H04W 28/10* (2009.01)
*H04L 47/765* (2022.01)

(52) U.S. Cl.
CPC ........... *H04W 28/10* (2013.01); *H04L 47/767* (2013.01)

(58) Field of Classification Search
CPC .................................................... H04L 47/767
See application file for complete search history.

(56) References Cited

U.S. PATENT DOCUMENTS

| | | | |
|---|---|---|---|
| 2020/0136906 A1 | 4/2020 | Guim Bernat et al. | |
| 2021/0092647 A1 | 3/2021 | Yang et al. | |
| 2022/0038378 A1* | 2/2022 | Zhang | H04L 61/4511 |
| 2022/0321475 A1* | 10/2022 | Thiebaut | H04L 47/11 |
| 2023/0050017 A1* | 2/2023 | Libby | H04M 15/64 |
| 2023/0078344 A1* | 3/2023 | Zhang | H04W 40/02 370/331 |
| 2023/0102552 A1* | 3/2023 | Ali | H04W 28/0273 370/329 |

FOREIGN PATENT DOCUMENTS

WO    2021108075 A1    6/2021

OTHER PUBLICATIONS

"International Search Report and Written Opinion Issued in PCT Patent Application No. PCT/US22/038283", Mailed Date: Dec. 19, 2022, 18 Pages.
"Invitation To Pay Additional Fees Issued in PCT Patent Application No. PCT/US22/038283", Mailed Date: Oct. 27, 2022, 12 Pages.

* cited by examiner

*Primary Examiner* — Marcus Smith
*Assistant Examiner* — Najeeb Ansari
(74) *Attorney, Agent, or Firm* — Ray Quinney & Nebeker; James Bullough

(57) ABSTRACT

A method for improving efficiency of routing edge compute traffic from a user equipment (UE) to an edge compute server at a far edge of a cellular network includes provisioning a near edge control unit (CU) and a near edge user plane function (UPF) at a near edge of the cellular network. The method also includes provisioning a far edge CU, a far edge UPF, and an edge compute workload at the far edge. The method also includes receiving UE traffic at one or more distributed units located at the far edge. The UE traffic includes the edge compute traffic and non-edge compute traffic. The method also includes identifying the edge compute traffic among the UE traffic, routing the edge compute traffic to the edge compute workload at the far edge, and routing the non-edge compute traffic to the near edge UPF at the near edge.

20 Claims, 15 Drawing Sheets

EFFICIENCY OF ROUTING TRAFFIC TO AN EDGE COMPUTE SERVER AT THE FAR EDGE OF A CELLULAR NETWORK

CROSS-REFERENCE TO RELATED APPLICATIONS

N/A

BACKGROUND

A cellular network provides mobile devices with access to services available from one or more external packet data networks. A cellular network is distributed over geographical areas that are typically referred to as "cells." Each cell can be served by at least one base station. One or more base stations provide a cell with network coverage. When joined together, these cells can provide network coverage over a wide geographic area.

A cellular network includes a core network and a radio access network (RAN). The core network can perform a variety of functions, including providing Internet protocol (IP) connectivity for both data and voice services, ensuring this connectivity fulfills the promised quality of service (QoS) requirements, ensuring that the UEs are properly authenticated, tracking user mobility to ensure uninterrupted service, tracking subscriber usage for billing and charging, and so forth. The RAN manages the radio spectrum, making sure it is used efficiently and meets users' QoS requirements.

Cellular networks have undergone significant changes over the past several decades. The first two generations of cellular networks supported voice and then text messaging. Third generation (3G) networks initiated the transition to broadband access, supporting data rates typically measured in hundreds of kilobits-per-second. Fourth generation (4G) networks supported data rates that were significantly faster, typically measured in megabits-per-second. Today, the industry is transitioning from 4G to fifth generation (5G) networks, with the promise of significant increases in data rates.

The 5G system architecture is significantly different from its predecessors in many respects. For example, in a 5G system, network management can be software driven, and network functions and resources can be virtualized and/or containerized at the edges and inside the network core. A 5G system implementation can be based on cloud-native applications, virtualized network functions, and/or microservices-based design patterns. In addition, a 5G system implementation can provide support for stateless network functions by decoupling compute and storage.

Some 5G deployments utilize network function virtualization (NFV). NFV is a network architecture concept that uses the general concept of computer virtualization to virtualize entire classes of network node functions into building blocks that can be connected together to create communication services. NFV entails the migration from custom-built network nodes to network functionality implemented in software running on commodity off-the-shelf hardware. A virtualized network function (VNF) can include one or more virtual machines or containers running different software and processes. A VNF can run on top of standard high-volume servers, switches and storage devices, or even cloud computing infrastructure. Various network functions can be implemented as VNFs on a commodity off-the-shelf computing platform instead of the prior approach of having custom hardware appliances for each network function.

Some 5G deployments utilize cloud-native network functions. A cloud-native network function (CNF) is a software implementation of a network function that has traditionally been implemented on a physical device. A CNF can alternatively be referred to as a containerized network function. A CNF is built and deployed in a cloud-native way. The term "cloud native" describes an approach to building and running applications that exploits the benefits of the cloud computing model. Cloud-native characteristics can include containers, microservices, continuous delivery, and cloud-based management.

Containerization is an approach to software development in which an application and all of its dependencies (e.g., required executables, binaries, libraries, configuration files) are bundled into a single, isolated package. Containers abstract the operating system (OS), and multiple containers on a server share a common OS kernel. In addition to containers, CNFs can use orchestration services that automate service functionality. CNFs also enable the use of microservices, which are services that work together as a distributed system.

Telecommunications operators are looking to extend the benefits of virtualization and containerization to radio access networks (RANs). In the discussion that follows, the term "software-based RAN" refers to a RAN that can be implemented, either partially or wholly, using software running on commodity off-the-shelf hardware. For example, a software-based RAN can be implemented using VNFs and/or CNFs. With a software-based RAN, the processing that has traditionally been performed by dedicated hardware can instead be implemented in software running on a commodity off-the-shelf hardware computing platform. This can provide intelligent scaling of computing resources, while decreasing energy consumption and capital expenditure.

The subject matter in the background section is intended to provide an overview of the overall context for the subject matter disclosed herein. The subject matter discussed in the background section should not be assumed to be prior art merely as a result of its mention in the background section. Similarly, a problem mentioned in the background section or associated with the subject matter of the background section should not be assumed to have been previously recognized in the prior art.

SUMMARY

In accordance with one aspect of the present disclosure, a method for improving efficiency of routing edge compute traffic from a user equipment (UE) to an edge compute server at a far edge of a cellular network is disclosed. The cellular network comprises a core network and a software-based radio access network (RAN). The method comprises provisioning a near edge control unit (CU) and a near edge user plane function (UPF) at a near edge of the cellular network. The near edge is located closer to the UE than a datacenter that hosts one or more components of the core network. The method also comprises provisioning a far edge CU, a far edge UPF, and an edge compute workload at the far edge. The far edge is located closer to the UE than the near edge. The method also comprises receiving UE traffic at one or more distributed units located at the far edge. The UE traffic comprises the edge compute traffic and non-edge compute traffic. The method also comprises identifying the edge compute traffic among the UE traffic, routing the edge compute traffic to the edge compute workload at the far edge, and routing the non-edge compute traffic to the near edge UPF at the near edge.

In some embodiments, identifying the edge compute traffic can comprise identifying a destination Internet protocol (IP) address in data packets corresponding to an IP flow, and determining that the destination IP address corresponds to the far edge compute server.

In some embodiments, identifying the edge compute traffic can comprise determining that an Internet protocol (IP) flow corresponds to a data radio bearer that is dedicated to the edge compute traffic.

In some embodiments, identifying the edge compute traffic can comprise receiving the edge compute traffic at a network slice that is dedicated to the edge compute traffic.

In some embodiments, the edge compute server can comprise the edge compute workload. The method can further comprise detecting, at the near edge UPF, that the UE has opened a connection to the edge compute server. In response to detecting that the UE has opened the connection to the edge compute server, the method can further comprise configuring a distributed unit (DU) at the far edge to forward the UE traffic to the far edge UPF instead of the near edge UPF, and configuring the far edge UPF to forward the edge compute traffic to the edge compute server.

In some embodiments, the method can further comprise configuring the far edge UPF to classify the UE traffic into the edge compute traffic and the non-edge compute traffic, and forward the non-edge compute traffic to the near edge UPF.

In some embodiments, all uplink traffic from the UE can be forwarded to the far edge UPF after the DU has been configured to forward the UE traffic to the far edge UPF.

In some embodiments, detecting that the UE has opened the connection to the edge compute server can comprise identifying an Internet protocol (IP) flow comprising data packets in which a destination IP address corresponds to the edge compute server.

In some embodiments, the method can further comprise detecting, at the far edge UPF, that the connection between the UE and the edge compute server is closed, and reconfiguring the DU to forward the UE traffic to the near edge UPF.

In accordance with another aspect of the present disclosure, a method for dynamically relocating an edge compute workload based on a current load at a far edge of a cellular network is disclosed. The method comprises configuring a far edge user plane function (UPF) located at the far edge to forward edge compute traffic to a far edge compute server located at the far edge. The far edge compute server is configured to execute the edge compute workload. The method also comprises consuming telemetry about the current load at the far edge. The current load is based at least in part on physical layer processing operations performed by one or more distributed units at the far edge. The method also comprises detecting, based on the telemetry, that the current load at the far edge exceeds a first threshold level. In response to determining that the current load at the far edge exceeds the first threshold level, the method comprises causing the edge compute workload to be migrated to a different edge location, deprovisioning the far edge compute server, and provisioning at least one additional distributed unit (DU) at the far edge.

In some embodiments, the different edge location can comprise a near edge of the cellular network.

In some embodiments, the different edge location can comprise another far edge of the cellular network.

In some embodiments, in response to determining that the current load at the far edge exceeds the first threshold level, the method can additionally comprise reconfiguring a DU at the far edge to forward user equipment (UE) traffic to a near edge central unit (CU), and deprovisioning a far edge CU and the far edge UPF.

In some embodiments, the method can also comprise configuring the far edge UPF to forward user equipment (UE) traffic to a near edge UPF in response to determining that the current load at the far edge exceeds the first threshold level.

In some embodiments, the method can also comprise consuming additional telemetry about the current load at the far edge and detecting, based on the additional telemetry, that the current load at the far edge has fallen below a second threshold level. In response to determining that the current load at the far edge has fallen below the second threshold level, the method can also comprise provisioning a new instance of the far edge compute server at the far edge, and causing the edge compute workload to be migrated to the new instance of the far edge compute server.

In some embodiments, in response to determining that the current load at the far edge has fallen below the second threshold level, the method can also comprise provisioning a new instance of the far edge CU and a new instance of the far edge UPF, configuring the DU to forward user equipment (UE) traffic to the new instance of the far edge CU, configuring the new instance of the far edge CU to forward the UE traffic to the new instance of the far edge UPF, and configuring the new instance of the far edge UPF to forward edge compute traffic to the new instance of the far edge compute server.

In some embodiments, in response to determining that the current load at the far edge has fallen below the second threshold level, the method can also comprise configuring the far edge UPF to forward edge compute traffic to the new instance of the far edge compute server.

In some embodiments, the method can also comprise provisioning a distributed unit (DU), a far edge central unit (CU), the far edge UPF, and the far edge compute server at the far edge. The method can also comprise configuring the DU to forward user equipment (UE) traffic to the far edge CU, and configuring the far edge CU to forward the UE traffic to the far edge UPF.

In accordance with another aspect of the present disclosure, a system for improving efficiency of routing edge compute traffic from a user equipment (UE) to an edge compute server at a far edge of a cellular network is disclosed. The cellular network comprises a core network and a software-based radio access network (RAN). The system comprises one or more processors, memory in electronic communication with the one or more processors, and instructions stored in the memory. The instructions are executable by the one or more processors to provision a near edge control unit (CU) and a near edge user plane function (UPF) at a near edge of the cellular network. The near edge is located closer to the UE than a datacenter that hosts one or more components of the core network. The instructions are also executable by the one or more processors to provision a far edge CU, a far edge UPF, and an edge compute workload at the far edge. The far edge is located closer to the UE than the near edge. The instructions are also executable by the one or more processors to receive UE traffic at one or more distributed units located at the far edge. The UE traffic comprises the edge compute traffic and non-edge compute traffic. The instructions are also executable by the one or more processors to identify the edge compute traffic among the UE traffic, route the edge compute traffic to the edge compute workload at the far edge, and route the non-edge compute traffic to the near edge UPF at the near edge.

In some embodiments, identifying the edge compute traffic comprises at least one of identifying a destination Internet protocol (IP) address in data packets corresponding to an IP flow and determining that the destination IP address corresponds to the far edge compute server, determining that an the IP flow corresponds to a data radio bearer that is dedicated to the edge compute traffic, or receiving the edge compute traffic at a network slice that is dedicated to the edge compute traffic.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description that follows. Features and advantages of the disclosure may be realized and obtained by means of the systems and methods that are particularly pointed out in the appended claims. Features of the present disclosure will become more fully apparent from the following description and appended claims, or may be learned by the practice of the disclosed subject matter as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. Understanding that the drawings depict some example embodiments, the embodiments will be described and explained with additional specificity and detail through the use of the accompanying drawings in which.

DETAILED DESCRIPTION

As noted above, the term "software-based RAN" refers to a RAN that can be implemented, either partially or wholly, using software running on commodity off-the-shelf hardware. For example, a software-based RAN can be implemented using VNFs and/or CNFs. Implementing a software-based RAN presents several significant challenges because the processing and timing requirements are very demanding with respect to certain functions performed by the RAN, particularly in connection with physical layer processing. For example, the signal processing operations for a particular transmission and/or reception should be completed in close to real time (e.g., within one millisecond) or else users experience degraded performance at best or a complete disconnection from the cellular network in the worst case.

Avoiding such performance degradation is important, because cellular networks are required to provide services with very high levels of reliability and low latency. In order to ensure that a software-based RAN can meet those strict deadlines, the standard practice of the industry is to use dedicated computing resources (e.g., dedicated CPU cores, dedicated cache and DRAM) and to provision the software-based RAN for peak capacity. A significant disadvantage of this practice is that a large portion of the computing resources allocated to the software-based RAN are left under-utilized most of the time, given that RAN workloads are bursty and the base stations operate with light or medium levels of traffic and not at peak capacity during most hours of the day. In some scenarios, the majority of the computing resources allocated to the software-based RAN might be left unutilized for significant periods of time, which can be very inefficient.

Figure 1:
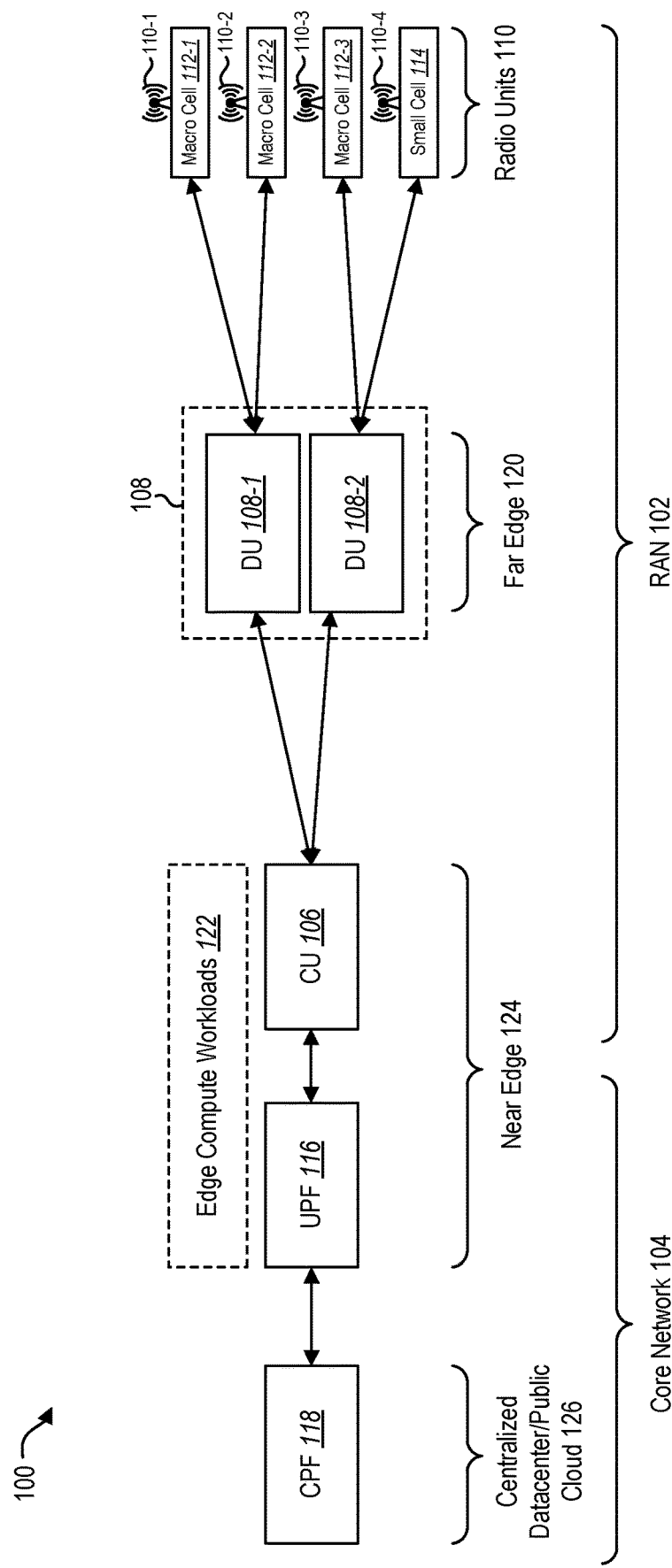
FIG. 1 illustrates an example of a cellular network in which RAN processing is distributed across a central unit, a plurality of distributed units, and a plurality of radio units.

FIG. 1 illustrates an example of a cellular network 100 including a RAN 102 and a core network 104. The processing in the RAN 102 can be distributed across a central unit (CU) 106, a plurality of distributed units 108, and a plurality of radio units 110.

Each radio unit 110 can serve a particular cell. FIG. 1 shows a first radio unit 110-1 serving a first macro cell 112-1, a second radio unit 110-2 serving a second macro cell 112-2, a third radio unit 110-3 serving a third macro cell 112-3, and a fourth radio unit 110-4 serving a small cell 114.

A radio unit 110 is an electronic device that is electrically coupled to an antenna that receives signals from a mobile device. A radio unit 110 receives signals from the antenna, digitizes them, and relays them over a network connection to a distributed unit (DU) 108.

In the cellular network 100 shown in FIG. 1, a first DU 108-1 serves radio units 110-1, 110-2. A second DU 108-2 serves radio units 110-3, 110-4. The CU 106 serves the DUs 108. The elements of the core network 104 that are shown in FIG. 1 include a user plane function (UPF) 116 and a control plane function (CPF) 118.

In some embodiments, the CU 106 can be responsible for radio resource control (RRC) processing and packet data convergence protocol (PDCP) processing. The DUs 108 can be responsible for radio link control (RLC) processing, media access control (MAC) processing, and physical layer (PHY) processing. The radio units 110 can also be responsible for some PHY processing, along with other functions (e.g., digital-to-analog and analog-to-digital conversion, and providing the radio frequency (RF) front end).

The RAN 102 can be a software-based RAN. In other words, at least some of the RAN components can be implemented using software running on commodity off-the-shelf hardware. In some embodiments, at least some aspects of the RAN 102 can be implemented using VNFs and/or CNFs.

Because DUs 108 perform physical layer processing, each DU 108 should be located relatively close to the radio unit(s) 110 that it manages. The location of the DUs 108 can be referred to herein as a far edge 120 of the cellular network 100. The far edge 120 can be a part of the cellular network 100 that is relatively close to the radio units 110 within the RAN 102. In some embodiments, the far edge 120 of the cellular network 100 can be located no more than a pre-defined distance (e.g., 20 kilometers) from the radio units 110 that are managed by the DUs 108 located at the far edge 120.

Advantageously, having the DUs 108 located at the far edge 120 can facilitate extremely low latency, making it possible for the DUs 108 to perform physical layer processing in real time (or close to real time). As discussed above, the RAN 102 is a real-time workload. The physical layer processing performed by the DUs 108 should be completed within a certain time bound in order for the RAN 102 to function properly and to have the appropriate performance characteristics. Having the DUs 108 located close enough to the radio units 110 (i.e., within the pre-defined distance mentioned above) reduces the network propagation delay and makes it possible for the real-time requirements of the RAN 102 workload to be satisfied.

There can be one or more physical structures located at the far edge 120. These physical structure(s) can include the commodity off-the-shelf computing devices on which the DUs 108 are implemented (e.g., as VNFs or CNFs). In some embodiments, the physical structure(s) at the far edge 120 can include one or more buildings. In some embodiments, the physical structure(s) at the far edge 120 can include a datacenter. Alternatively, in some embodiments, the physical structure(s) at the far edge 120 can include another type of physical structure (e.g., a locked cabinet, which could be located outdoors).

In the depicted example, the CU 106 and the UPF 116 can be located at a near edge 124 of the cellular network 100. The near edge 124 can also include one or more edge compute workloads 122. The edge compute workloads 122 can be compute workloads that benefit from being close to the devices that they are communicating with (e.g., the mobile devices that are connected to the macro cells 112-1, 112-2, 112-3 and small cell 114 of the cellular network 100).

The CU 106, the UPF 116, and the edge compute workloads 122 can be implemented using software running on commodity off-the-shelf computers. For example, the CU 106, the UPF 116, and the edge compute workloads 122 can be implemented using VNFs and/or CNFs.

The near edge 124 can be a part of the cellular network 100 that is closer to the radio units 110 within the RAN 102 than some other parts of the cellular network 100. For example, the near edge 124 can be closer to the radio units 110 within the RAN 102 than aspects of the core network 104 (e.g., the CPF 118) that are hosted in a centralized datacenter/public cloud 126. At the same time, the near edge 124 can be farther away from the radio units 110 than the far edge 120.

Like the far edge 120, there can be one or more physical structures located at the near edge 124. These physical structure(s) can include the commodity off-the-shelf computing devices on which the CU 106, the UPF 116, and the edge compute workloads 122 are implemented (e.g., as VNFs or CNFs). In some embodiments, the physical structure(s) at the near edge 124 can include one or more buildings. In some embodiments, the physical structure(s) at the near edge 124 can include a datacenter. The physical structure(s) at the near edge 124 can be relatively small (e.g., significantly smaller than centralized datacenters that implement a public cloud).

In the context of a computing environment, a workload can be a specific amount of work that can be performed by a computing device. Workloads can take a variety of different forms. Workloads can be executed by virtual machines, containers, applications, databases, etc. The edge compute workloads 122 can include workloads that are executed at an edge location, such as a near edge 124 and/or a far edge 120.

One of the important benefits of executing a workload at an edge location is reduced latency. As discussed above, low latency can be required for the real-time aspects of the RAN workload, but it can also be a benefit of hosting edge compute applications at the far edge 120. In other words, when edge compute applications are hosted at the far edge 120, it is possible to have very low latency from the mobile device to a server that can be executing workloads on behalf of that mobile device.

As noted above, RAN workloads are bursty. On some occasions, a relatively large number of UEs access services via the cellular network 100. During these times, the DUs 108 can require a significant amount of computing resources in order to perform signal processing operations (e.g., physical layer processing) for communications with UEs. At other times, however, far fewer UEs access services via the cellular network 100. During these times, far fewer computing resources are required for signal processing operations. Because enough computing resources should be provisioned to handle peak workloads, there is likely to be significant idleness on the servers at the far edge 120 that are handling the workloads of the DUs 108.

Having the servers at the far edge 120 be idle for significant periods of time can be inefficient. The vast majority of the compute resources in deploying a 5G cellular network can be dedicated to the RAN, because the RAN can be the most compute intensive piece of the 5G cellular network. In addition, most of the compute resources needed for the RAN can be located at the DU(s). This is because the DU(s) are doing the physical layer processing, and the physical layer processing is the most compute intensive piece of the RAN. Thus, the majority of the compute resources that are used to deploy the cellular network 100 shown in FIG. 1 can be located at the far edge 120.

The present disclosure is generally related to utilizing the available computing resources at the far edge 120 during periods of low demand. More specifically, the present disclosure is generally related to techniques for using some of the available computing resources at the far edge 120 to host edge compute workloads, such as the edge compute workloads 122 that are shown at the near edge 124 in FIG. 1.

One aspect of utilizing the available computing resources at the far edge 120 during periods of low demand is addressed by U.S. patent application Ser. No. 16/941,033, titled "Sharing of Computing Resources Between the Virtualized Radio Access Network (vRAN) and Other Workloads" (hereinafter, "the '033 application"), which is owned by the assignee of the present application. The '033 application describes a scheduling framework that enables high-priority vRAN signal processing tasks and other lower priority workloads to be co-located on the same servers.

The present application addresses another aspect of utilizing the available computing resources at the far edge 120 during periods of low demand. In particular, the present application discloses techniques for improving the efficiency of the traffic path from a UE to the edge compute workload(s) that are located at the far edge 120.

Figure 1A:
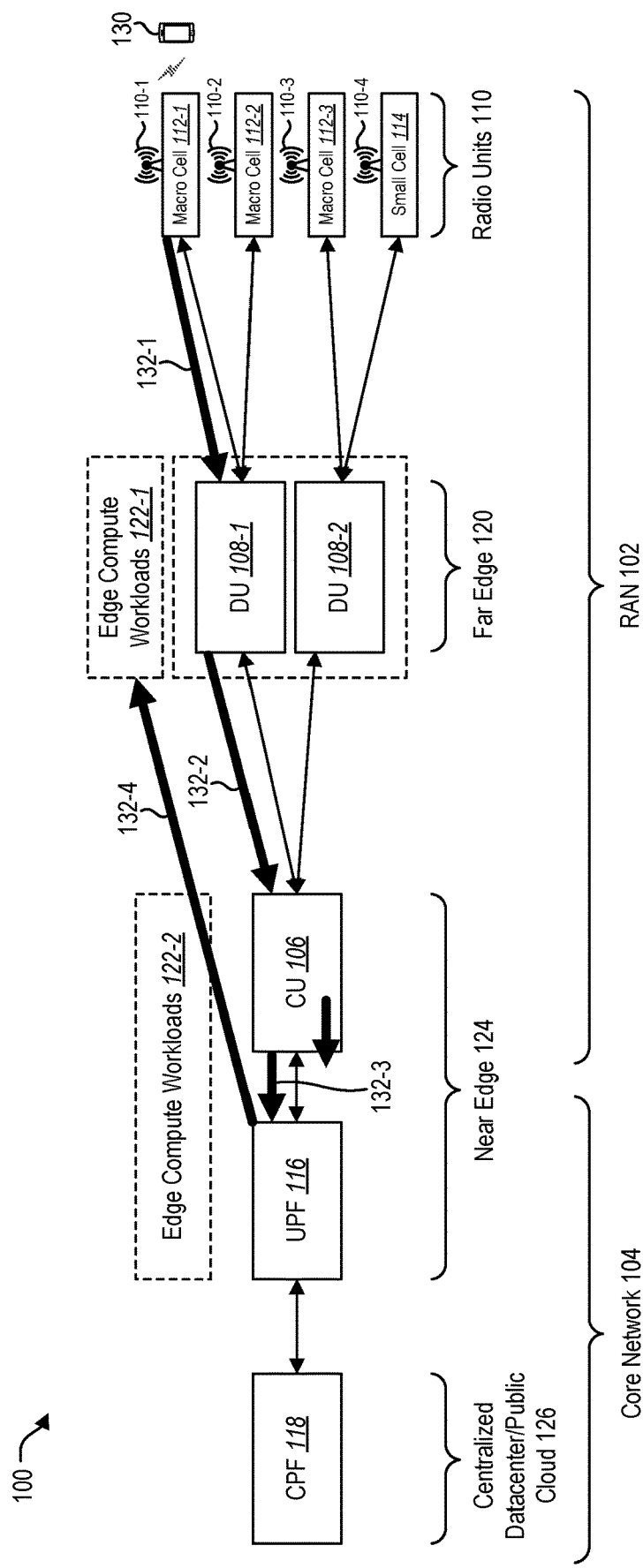
FIG. 1A illustrates the cellular network shown in FIG. 1 with edge compute workloads hosted at a far edge in addition to edge compute workloads hosted at a near edge.

FIG. 1A illustrates the cellular network 100 shown in FIG. 1 with edge compute workloads 122-1 implemented at a far edge 120 in addition to edge compute workloads 122-2 implemented at a near edge 124. A UE 130 is wirelessly connected to the macro cell 112-1 that is served by the radio unit 110-1. The arrows 132-1, 132-2, 132-3, 132-4 show one possible traffic path from the UE 130 to the edge compute workloads 122-1 at the far edge 120. Traffic flows from the UE 130 to the DU 108-1 (as shown by the arrow 132-1), from the DU 108-1 to the CU 106 (as shown by the arrow 132-2), from the CU 106 to the UPF 116 (as shown by the arrow 132-3), and from the UPF 116 back to the edge compute workloads 122-1 at the far edge 120 (as shown by the arrow 132-4).

The traffic path shown in FIG. 1A is not optimal. Traffic flows from the far edge 120 to the near edge 124 and then back to the far edge 120. Unfortunately, the inefficiency of the traffic path shown in FIG. 1A nullifies the latency benefits that could otherwise be achieved from hosting the edge compute workloads 122-1 at the far edge 120 of the cellular network 100.

In accordance with one aspect of the present disclosure, the efficiency of the traffic path from the UE 130 to the edge compute workloads 122-1 at the far edge 120 of the cellular network 100 can be improved by hosting an instance of the CU 106 and an instance of the UPF 116 at the far edge 120. An instance of the CU 106 hosted at a far edge 120 may be referred to herein as a far edge CU. An instance of the UPF 116 hosted at a far edge 120 may be referred to herein as a far edge UPF. In accordance with one aspect of the present disclosure, a DU 108 at a far edge 120 can be configured to forward UE traffic to the far edge CU, and the far edge CU can be configured to forward UE traffic to the far edge UPF. The far edge UPF can then forward the edge compute traffic to one or more edge compute servers at the far edge 120. In this way, the inefficiency of the traffic path shown in FIG. 1A (in which traffic flows from a far edge 120 to a near edge 124 and then back to the far edge 120) can be eliminated.

Figure 2:
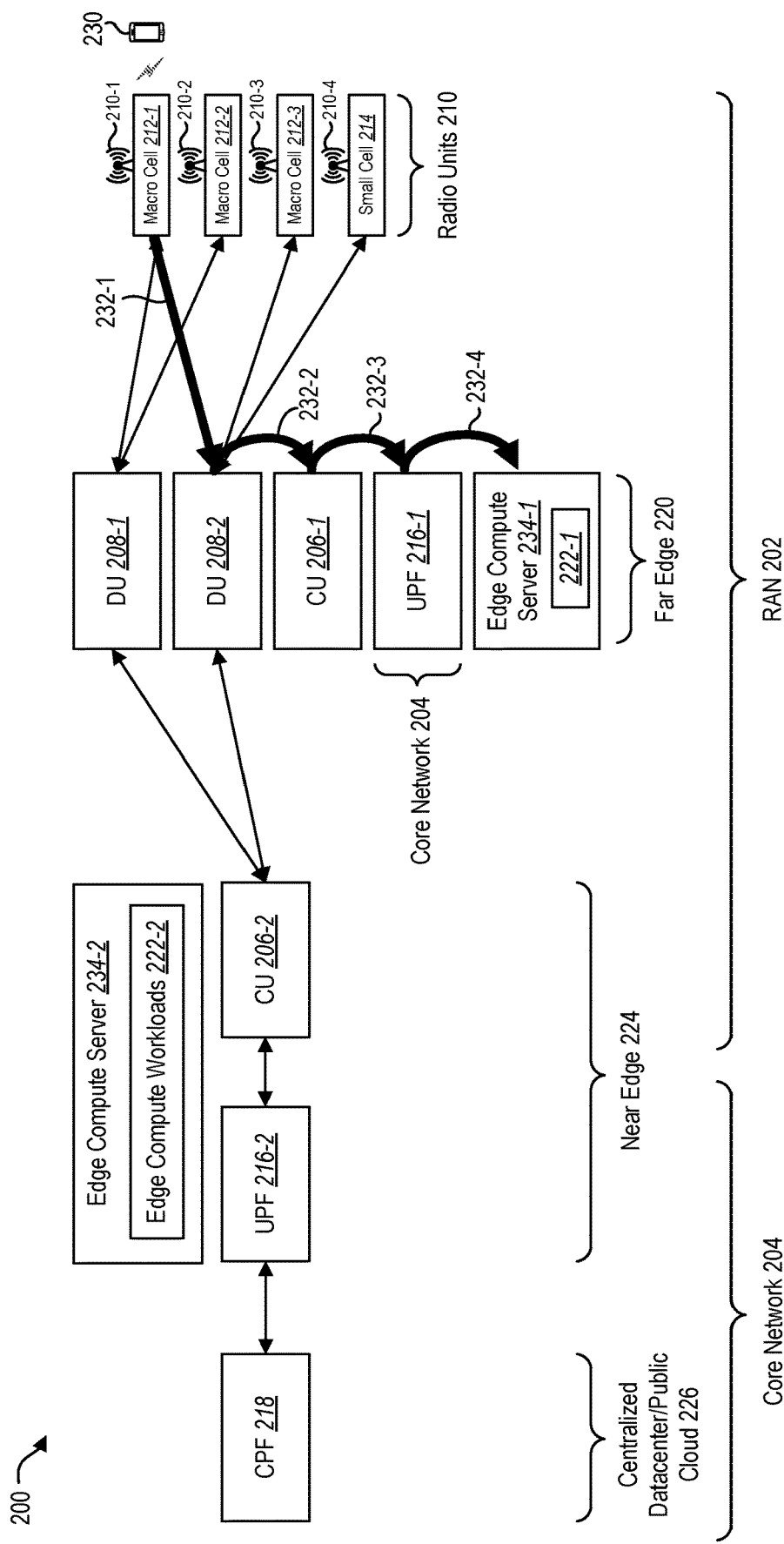
FIG. 2 illustrates another example of a cellular network with edge compute workloads implemented at a far edge.

FIG. 2 illustrates another example of a cellular network 200 with edge compute workloads 222-1 hosted at a far edge 220. In the example shown in FIG. 2, the traffic path from a UE 230 to the edge compute workloads 222-1 is more efficient than the traffic path shown in FIG. 1A. The traffic path shown in FIG. 2 can be thought of as a "short cut" path.

Like the cellular network 100 described previously, the RAN 202 in the cellular network 200 shown in FIG. 2 includes a plurality of DUs 208-1, 208-2 and a plurality of radio units 210. A first radio unit 210-1 serves a first macro cell 212-1, a second radio unit 210-2 serves a second macro cell 212-2, a third radio unit 210-3 serves a third macro cell 212-3, and a fourth radio unit 210-4 serves a small cell 214. The core network 204 includes a CPF 218 that is hosted in a centralized datacenter/public cloud 226.

However, in the cellular network 200 shown in FIG. 2, the RAN 202 includes a CU 206-1 at the far edge 220 in addition to a CU 206-2 at a near edge 224. In addition, the core network 204 in the cellular network 200 shown in FIG. 2 includes a UPF 216-1 at the far edge 220 in addition to a UPF 216-2 at the near edge 224.

Having a CU 206-1 and a UPF 216-1 at the far edge 220 enables the traffic path from the UE 230 to the edge compute workloads 222-1 at the far edge 220 to be more efficient than the traffic path that was described above in connection with FIG. 1A. In the cellular network 200 shown in FIG. 2, traffic flows from the UE 230 to the radio unit 210-1, from the radio unit 210-1 to the DU 208-2 (as shown by the arrow 232-1), from the DU 208-2 to the CU 206-1 at the far edge 220 (as shown by the arrow 232-2), from the CU 206-1 at the far edge 220 to the UPF 216-1 at the far edge 220 (as shown by the arrow 232-3), and from the UPF 216-1 at the far edge 220 to the edge compute workloads 222-1 at the far edge 220 (as shown by the arrow 232-4). Thus, the configuration of the RAN 202 in the cellular network 200 shown in FIG. 2 eliminates the inefficient aspects of the traffic path in FIG. 1A that was described previously (where traffic flows from the far edge 120 to the near edge 124 and then back to the far edge 120). Accordingly, the configuration of the RAN 202 in the cellular network 200 shown in FIG. 2 enables the latency benefits of hosting the edge workloads 222-1 at the far edge 220 to be realized.

The edge compute workloads 222-1 are shown on an edge compute server 234-1 at the far edge 220. Similarly, the edge compute workloads 222-2 are shown on an edge compute server 234-2 at the near edge 224. An edge compute server can be a computing device or a combination of computing devices that can be used to execute edge compute workloads. In some embodiments, an edge compute server can include one or more VNFs and/or CNFs that execute the edge compute workloads.

The DUs 208-1, 208-2, CU 206-1, UPF 216-1, and edge compute workloads 222-1 can run on a small set of servers at the far edge 220. In some embodiments, this set of servers can be located within the same server rack. In some embodiments, the DUs 208-1, 208-2, CU 206-1, UPF 216-1, and edge compute workloads 222-1 can run on the same server at the far edge 220.

The DUs 208-1, 208-2 service all traffic from the various radio units 210. The CU 206-1, the UPF 216-1, and the edge compute workloads 222-1 only service the edge compute traffic. The edge compute traffic is shown by the arrows 232-1, 232-2, 232-3, 232-4. The remainder of the traffic still flows through the CU 206-2 and the UPF 216-2 that are located at the near edge 224. If the cellular network 200 were configured otherwise (e.g., if all of the traffic from all UEs connected to the radio units 210 flowed through the CU 206-1 and the UPF 216-1 at the far edge 220) then it would be necessary to have many more computing resources at the far edge 220, which is not cost efficient because the far edge 220 is space and energy constrained.

Figure 3A:
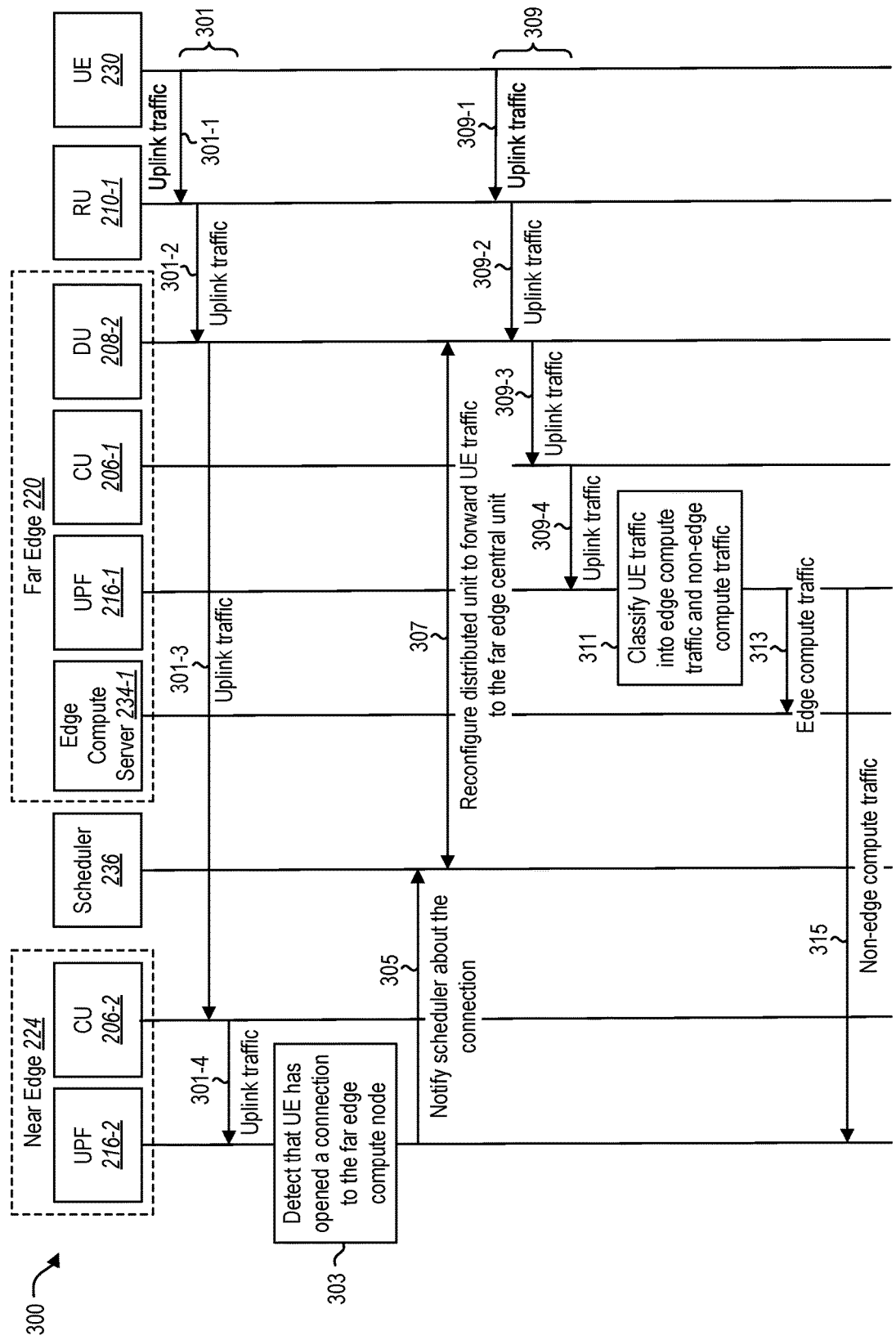
FIGS. 3A and 3B illustrate an example of a method for reducing latency of uplink traffic associated with edge compute workloads in a cellular network in accordance with the present disclosure.
Figure 3B:
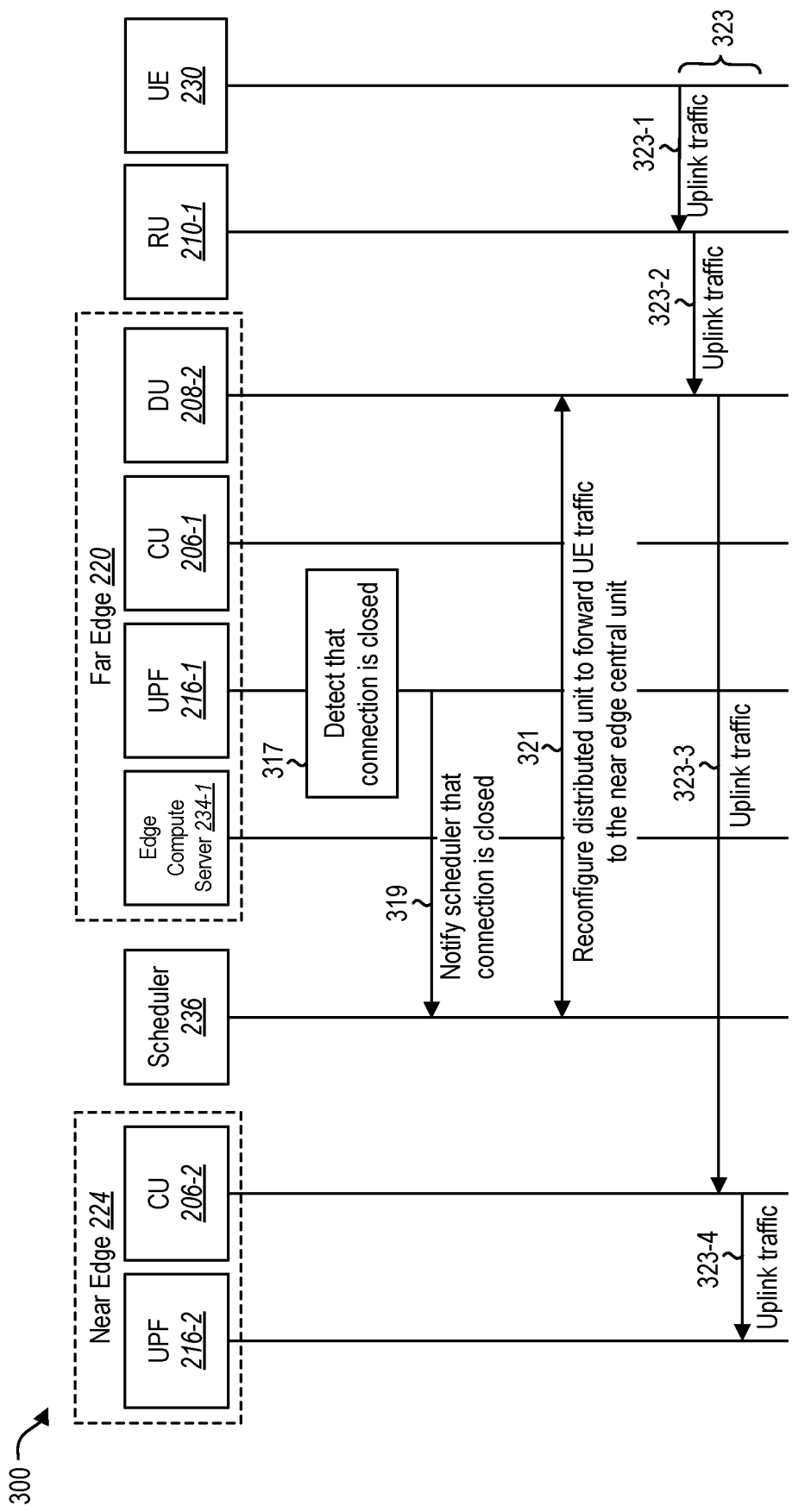

FIGS. 3A and 3B illustrate an example of a method 300 for reducing latency of edge compute workloads 222-1 in a cellular network 200 in accordance with the present disclosure. The method 300 will be described in relation to the cellular network 200 shown in FIG. 2. The method 300 involves the UE 230, components at the far edge 220, and components at the near edge 224. The components at the far edge 220 include the DU 208-2, the CU 206-1, the UPF 216-1, and an edge compute server 234-1 that executes one or more edge compute workloads 222-1. These components will be referred to as the far edge DU 208-2, the far edge CU 206-1, the far edge UPF 216-1, and the far edge compute server 234-1. The components at the near edge 224 include a CU 206-2 and a UPF 216-2. These components will be referred to as the near edge CU 206-2 and the near edge UPF 216-2.

The method 300 also involves a scheduler 236. The scheduler 236 can be hosted at any suitable location (or locations) within the cellular network 200. For example, the scheduler 236 could be hosted at the far edge 220, at the near edge 224, at a centralized datacenter, or in the public cloud. In some embodiments, the scheduler 236 could be hosted at a combination of two or more of the foregoing locations.

The method 300 shown in FIGS. 3A and 3B can be performed at some point after the UE 230 has connected to the cellular network 200 and started to receive service from the cellular network 200.

Reference is initially made to FIG. 3A. At 301, uplink traffic flows from the UE 230 to the near edge UPF 216-2. More specifically, at 301-1, uplink traffic flows from the UE 230 to the radio unit (RU) 210-1. At 301-2, uplink traffic flows from the RU 210-1 to the DU 208-2. At 301-3, uplink traffic flows from the DU 208-2 to the near edge CU 206-2. At 301-4, uplink traffic flows from the near edge CU 206-2 to the near edge UPF 216-2.

At 303, the near edge UPF 216-2 detects that the UE 230 has opened a connection to the far edge compute server 234-1. The DU 208-2 and the near edge CU 206-2 are not able to identify the destination IP address in the traffic that leaves the UE 230, so they just continue to forward the traffic along the path shown in FIG. 2. However, the near edge UPF 216-2 can identify the destination IP address in the traffic that leaves the UE 230. In some embodiments, detecting that the UE 230 has opened a connection to the far edge compute server 234-1 can include identifying an IP flow comprising data packets in which the destination IP address corresponds to the far edge compute server 234-1, and inferring from the destination IP address in these data packets that the UE 230 has opened a connection to the far edge compute server 234-1.

In some embodiments, the near edge UPF 216-2 can maintain (or have access to) a list of IP addresses of edge compute servers (such as the far edge compute server 234-1) at the far edge 220. When the near edge UPF 216-2 is involved in opening a connection to a particular compute node, the near edge UPF 216-2 can determine whether the compute node is on the list. If so, then the near edge UPF 216-2 can infer that the UE 230 has opened a connection to an edge compute server (such as the far edge compute server 234-1) at the far edge 220.

At 305, in response to detecting that the UE 230 has opened a connection to the far edge compute server 234-1, the near edge UPF 216-2 notifies the scheduler 236 about the connection. In some embodiments, notifying the scheduler 236 about the connection can include sending one or more messages to the scheduler 236. These message(s) can identify the UE 230.

At 307, in response to being notified about the connection that the UE 230 has opened to the far edge compute server 234-1, the scheduler 236 causes the DU 208-2 to be reconfigured so that the DU 208-2 forwards uplink traffic from the UE 230 to the far edge CU 206-1. In some embodiments, the scheduler 236 can cause the DU 208-2 to be reconfigured by sending one or more commands to the DU 208-2 (either directly or via one or more intermediate nodes). The command(s) can include instructions that, when carried out by the DU 208-2, cause the DU 208-2 to be reconfigured as described above.

At 309, uplink traffic flows from the UE 230 to the far edge UPF 216-1. More specifically, at 309-1, uplink traffic flows from the UE 230 to the RU 210-1. At 309-2, uplink traffic flows from the RU 210-1 to the DU 208-2. At 309-3, because the DU 208-2 has been reconfigured as described above, uplink traffic now flows from the DU 208-2 to the far edge CU 206-1 (instead of flowing from the DU 208-2 to the near edge CU 206-2, as it previously did). At 309-4, uplink traffic flows from the far edge CU 206-1 to the far edge UPF 216-1.

At this point in the method 300, all of the uplink traffic from the UE 230 (including traffic that is destined for the far edge compute server 234-1 as well as traffic that is intended for other destinations) is being sent to the far edge UPF 216-1. Non-edge compute traffic from other UEs may continue to be sent along the standard path (e.g., from the DU 208-2 to the near edge CU 206-2 and the near edge UPF 216-2).

At 311, the far edge UPF 216-1 classifies the uplink traffic from the UE 230 into edge compute traffic and non-edge compute traffic. The edge compute traffic is traffic that should be forwarded to the far edge compute server 234-1. The non-edge compute traffic is traffic that is intended for another destination other than the far edge compute server 234-1.

At 313, the far edge UPF 216-1 forwards the edge compute traffic to the far edge compute server 234-1. At 315, the far edge UPF 216-1 forwards the non-edge compute traffic to the near edge UPF 216-2. The near edge UPF 216-2 can forward the non-edge compute traffic to its ultimate destination, or to the next location on its way to its ultimate destination. The near edge UPF 216-2 can be connected to a data network. When the non-edge compute traffic leaves the near edge UPF 216-2, it can be sent to the data network. In some embodiments, the near edge UPF 216-2 can send the non-edge compute traffic to one or more servers that are either connected to the Internet or that are running compute workloads locally.

Reference is now made to FIG. 3B. At 317, the far edge UPF 216-1 detects that the connection between the UE 230 and the far edge compute server 234-1 has been closed. In some embodiments, detecting that the connection between the UE 230 and the far edge compute server 234-1 has been closed can involve detecting a message that explicitly indicates that the connection has been closed. Alternatively, in some embodiments, detecting that the connection between the UE 230 and the far edge compute server 234-1 has been closed can involve a timeout mechanism.

At 319, the far edge UPF 216-1 can notify the scheduler 236 that the connection between the UE 230 and the far edge compute server 234-1 has been closed. At 321, in response to being notified that the connection is closed, the scheduler 236 causes the DU 208-2 to be reconfigured so that the DU 208-2 forwards uplink traffic from the UE 230 to the near edge CU 206-2.

At 323, after the DU 208-2 has been reconfigured, uplink traffic once again flows from the UE 230 to the near edge UPF 216-2. More specifically, at 323-1, uplink traffic flows from the UE 230 to the RU 210-1. At 323-2, uplink traffic flows from the RU 210-1 to the DU 208-2. At 323-3, uplink traffic flows from the DU 208-2 to the near edge CU 206-2. At 323-4, uplink traffic flows from the near edge CU 206-2 to the near edge UPF 216-2.

The method 300 shown in FIGS. 3A and 3B enables communication between a UE 230 and a far edge compute server 234-1 that is executing edge compute workloads 222-1 with low latency. There can be an initial set-up phase at the very beginning of the communication during which various functions are performed, such as authentication. During this initial set-up phase, traffic can still flow all the way to the near edge 224 and potentially farther (e.g., to the centralized datacenter/public cloud 226, if the CPF 218 is hosted there). However, once the connection has been established between the UE 230 and the far edge compute server 234-1 and they are just exchanging data with each other, communication can occur from the UE 230 to the far edge compute server 234-1 with low latency.

Figure 4A:
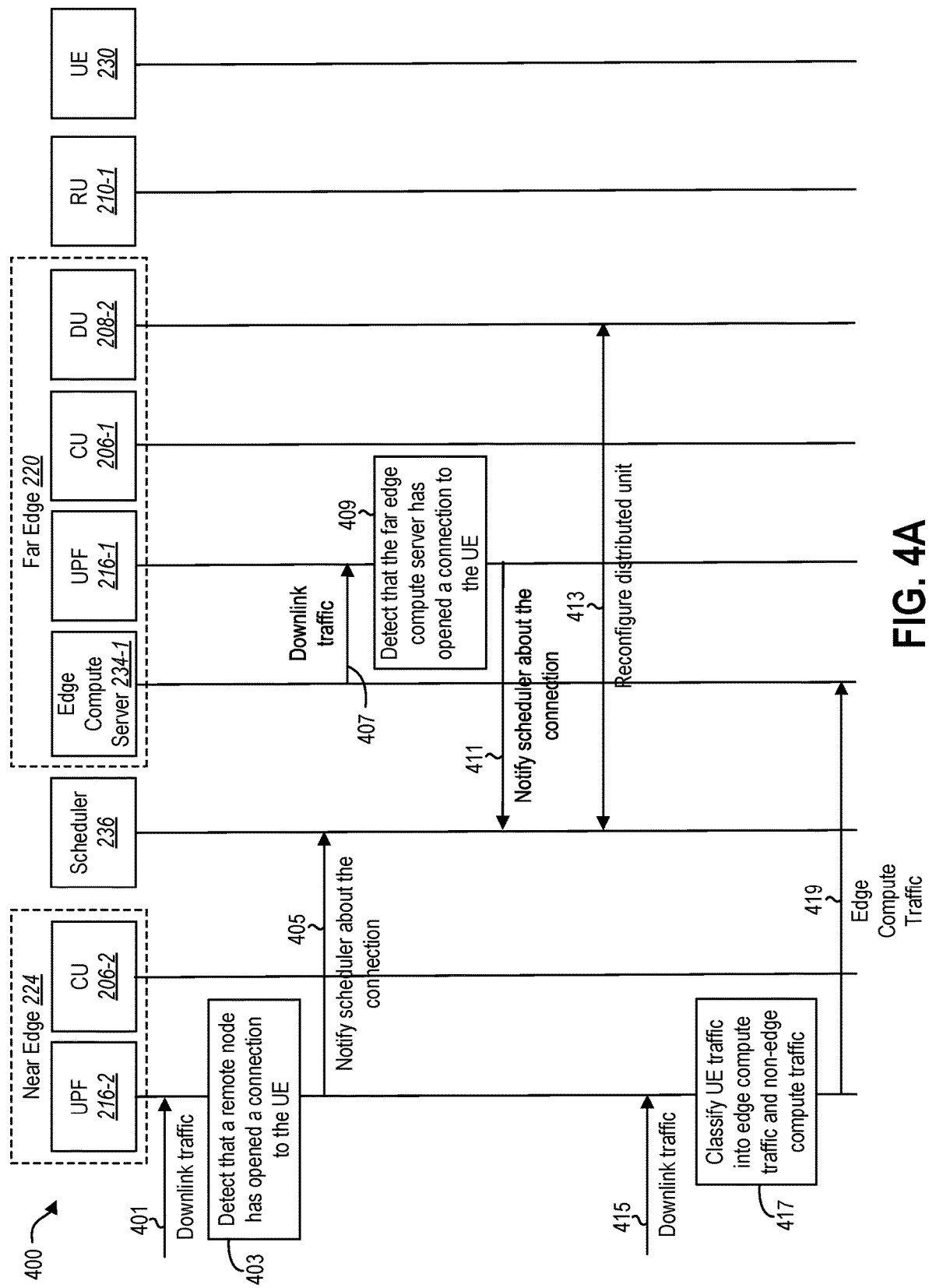
FIGS. 4A and 4B illustrate an example of a method for reducing latency of downlink traffic associated with edge compute workloads in a cellular network in accordance with the present disclosure.
Figure 4B:
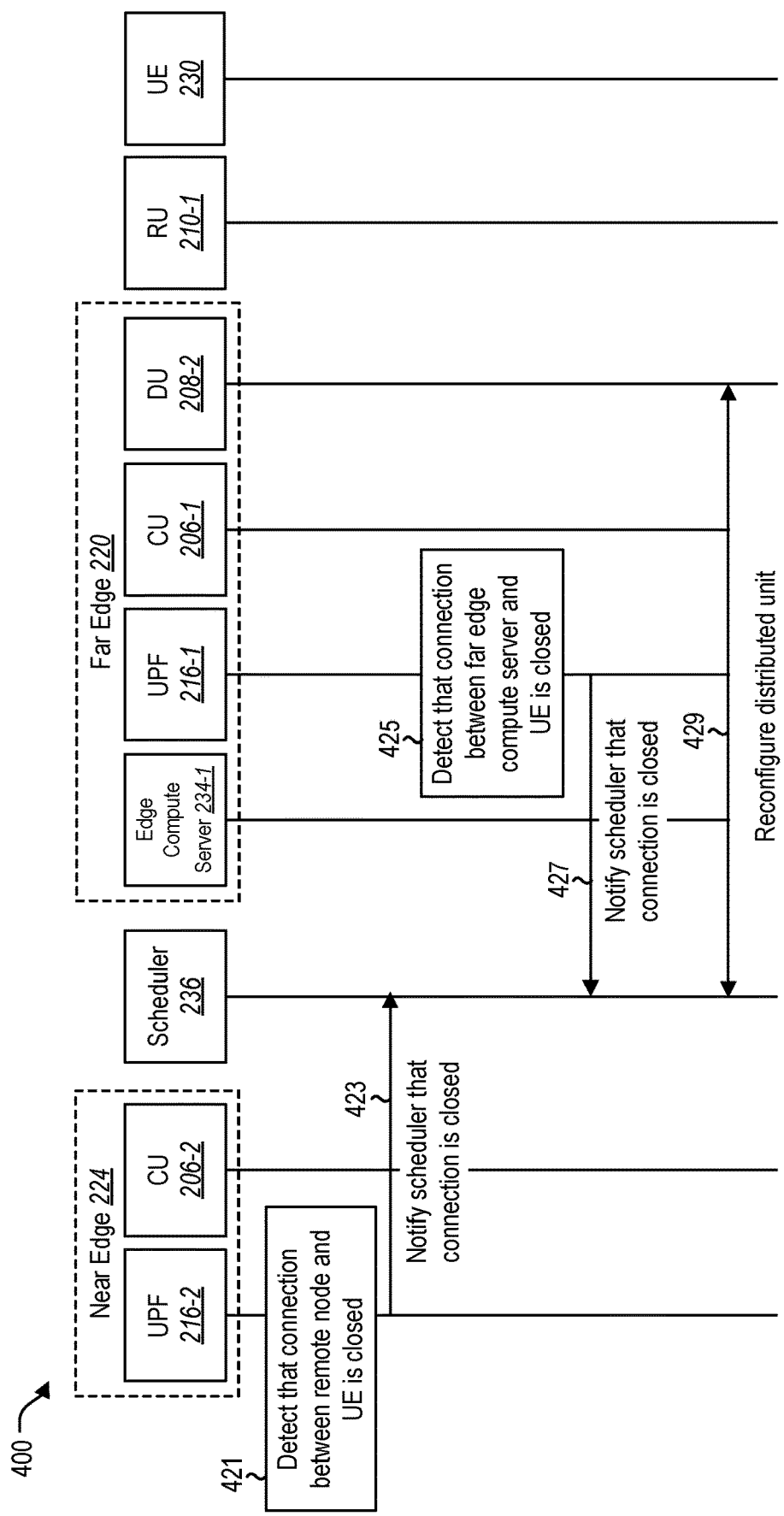

FIGS. 4A and 4B illustrate an example of a method 400 that is similar to the method 300 shown in FIGS. 3A and 3B, except that the method 400 shown in FIGS. 4A and 4B shows downlink traffic.

Two different scenarios for downlink traffic are shown in FIGS. 4A and 4B. In the first scenario, the downlink traffic occurs as a result of a remote node opening a connection to the UE 230. In the second scenario, the downlink traffic occurs as a result of the far edge compute server 234-1 opening a connection to the UE 230.

Reference is initially made to FIG. 4A. At 401, downlink traffic is received at the near edge UPF 216-2. The downlink traffic can be received as a result of a remote node opening a connection to the UE 230. At 403, the near edge UPF 216-2 detects that a remote node has opened a connection to the UE 230. At 405, in response to detecting that a remote node has opened a connection to the UE 230, the near edge UPF 216-2 notifies the scheduler 236 about the connection.

At 407, downlink traffic is received at the far edge UPF 216-1. The downlink traffic can be received as a result of the far edge compute server 234-1 opening a connection to the UE 230. At 409, the far edge UPF 216-1 detects that the far edge compute server 234-1 has opened a connection to the UE 230. At 411, in response to detecting that the far edge compute server 234-1 has opened a connection to the UE 230, the far edge UPF 216-1 notifies the scheduler 236 about the connection.

At 413, in response to being notified about the connection(s), the scheduler 236 causes the DU 208-2 to be reconfigured in the manner described above. The reconfiguration 413 shown in FIG. 4A can represent any reconfiguration that is performed in response to the scheduler 236 being notified that a remote node has opened a connection to the UE 230 and/or that the far edge compute server 234-1 has opened a connection to the UE 230.

At 415, additional downlink traffic is received at the near edge UPF 216-2. This additional downlink traffic is sent by the remote node. At 417, the near edge UPF 216-2 classifies the UE traffic into edge compute traffic and non-edge compute traffic. At 419, the near edge UPF 216-2 forwards the edge compute traffic to the edge compute server 234-1.

Reference is now made to FIG. 4B. At 421, the near edge UPF 216-2 detects that the connection between the UE 230 and the remote node has been closed. At 423, the near edge UPF 216-2 notifies the scheduler 236 that the connection is closed.

At 425, the far edge UPF 216-1 detects that the connection between the far edge compute server 234-1 and the UE 230 has been closed. At 427, the far edge UPF 216-1 notifies the scheduler 236 that the connection is closed.

At 429, in response to being notified that the connection(s) is/are closed, the scheduler 236 causes the DU 208-2 to be reconfigured in the manner described above. The reconfiguration 429 shown in FIG. 4B can represent any reconfiguration that is performed in response to the scheduler 236 being notified that the connection between the remote node and the UE 230 has been closed and/or that the connection between the far edge compute server 234-1 and the UE 230 has been closed.

A cellular network 200 can provide service for a variety of different applications with different demands. As discussed above, it is not feasible for communications from all of these applications to be processed at the far edge 220. Communications from high-priority applications (e.g., video applications, fast-action game playing applications) that require low latency or could benefit from low latency can be processed at the far edge 220 in the manner described above. Policies can be defined for determining which applications have their data processed at the far edge 220. Such policies can be based on various factors, such as the type of application, whether the user has paid an extra fee for better service, etc. In some embodiments, a decision about whether an application should be processed at the far edge 220 can be based at least in part on information in a user's subscriber profile, which can be stored in the control plane of the core network.

The allocation of edge compute workloads at the far edge can be dynamically adjusted based on the current load being experienced by the servers at the far edge. Another aspect of the present disclosure is related to dynamically adapting the behavior of one or more far edge components (e.g., a DU, a far edge UPF) based on changes that are made to the allocation of edge compute workloads at the far edge.

Figure 5A:
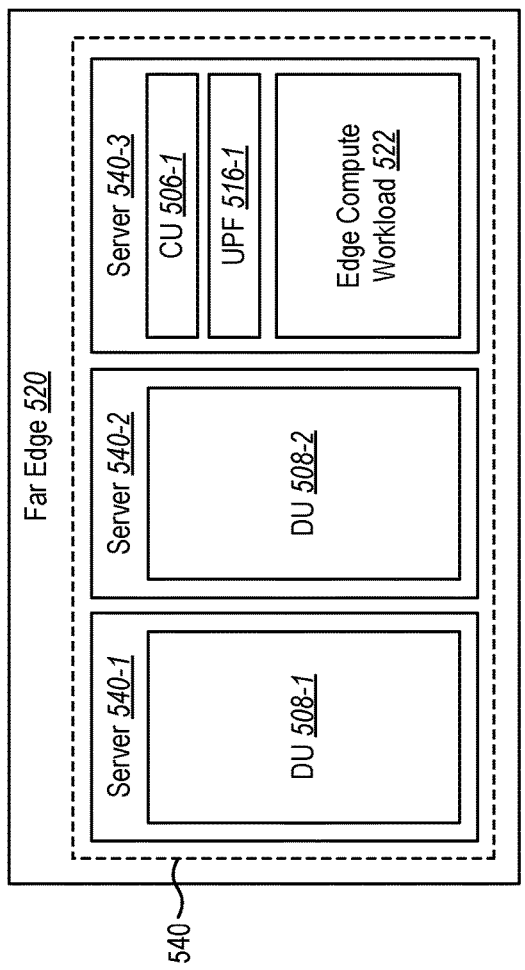
FIGS. 5A and 5B illustrate an example showing how the allocation of an edge compute workload at a far edge installation can be dynamically adjusted.
Figure 5B:
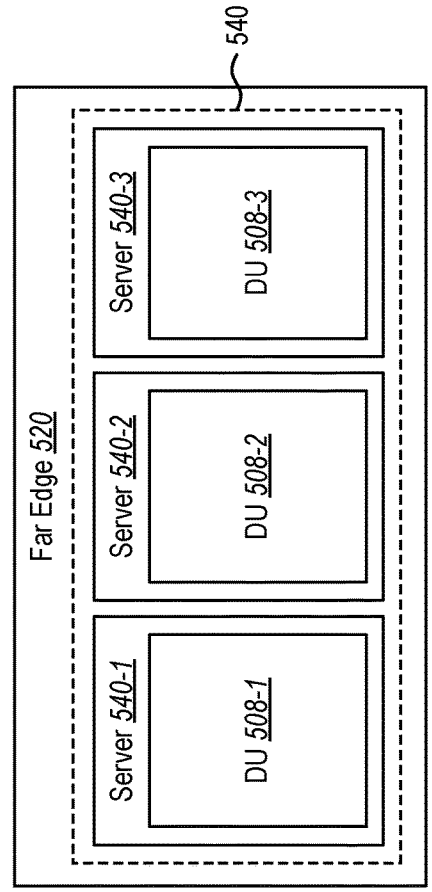
Figure 5B:
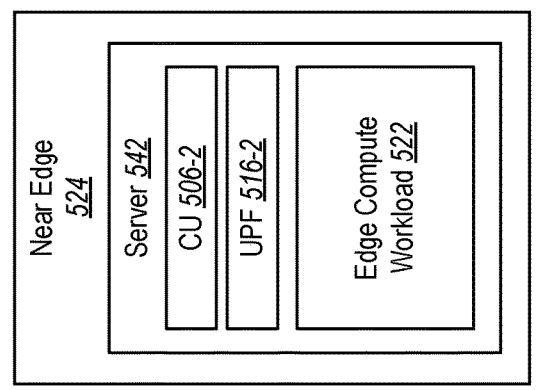

FIGS. 5A and 5B illustrate an example showing how the allocation of an edge compute workload 522 at a far edge 520 can be dynamically adjusted. Reference is initially made to FIG. 5A, which shows the contents of a plurality of servers 540 at a far edge 520 at a first point in time ($t_1$). A first server 540-1 is running a first DU 508-1. A second server 540-2 is running a second DU 508-2. A third server 540-3 is running a CU 506-1, a UPF 516-1, and an edge compute workload 522.

Reference is now made to FIG. 5B, which shows the contents of the plurality of servers 540 at the far edge 520 at a second point in time ($t_2$), where $t_2$ occurs after $t_1$. For purposes of the present example, it will be assumed that the load on the first DU 508-1 and the second DU 508-2 has increased significantly between $t_1$ and $t_2$. In response to the increase in the load, a scheduler decides to instantiate a third DU 508-3 on the third server 540-3 to ensure that the RAN has sufficient capacity to handle the current load. To make room for the third DU 508-3, the scheduler decides to migrate the edge compute workload 522 to another location. In the depicted example, the edge compute workload 522 has been migrated to a server 542 at a near edge 524. For purposes of example, the server 542 at the near edge 524 is also shown with a CU 506-2 and a UPF 516-2.

In an alternative embodiment, the edge compute workload 522 can be migrated to another location other than the near edge 524. For example, in some embodiments, the edge compute workload 522 can be migrated to another far edge location.

The behavior of one or more components at the far edge 520 can be dynamically modified based on the migration of the edge compute workload 522 from the far edge 520 to the near edge 524. For example, at time $t_1$, a DU (e.g., the first DU 508-1) that is receiving transmissions from a particular UE can be configured to forward uplink traffic from the UE to the far edge CU 506-1. This can be done in response to detecting that the UE has opened a connection to the server 540-3 at the far edge 520. However, at time $t_2$, because the edge compute workload 522 has been migrated to the near edge 524, the DU can be reconfigured so that it forwards uplink traffic from the UE to the near edge CU 506-2.

Figure 6:
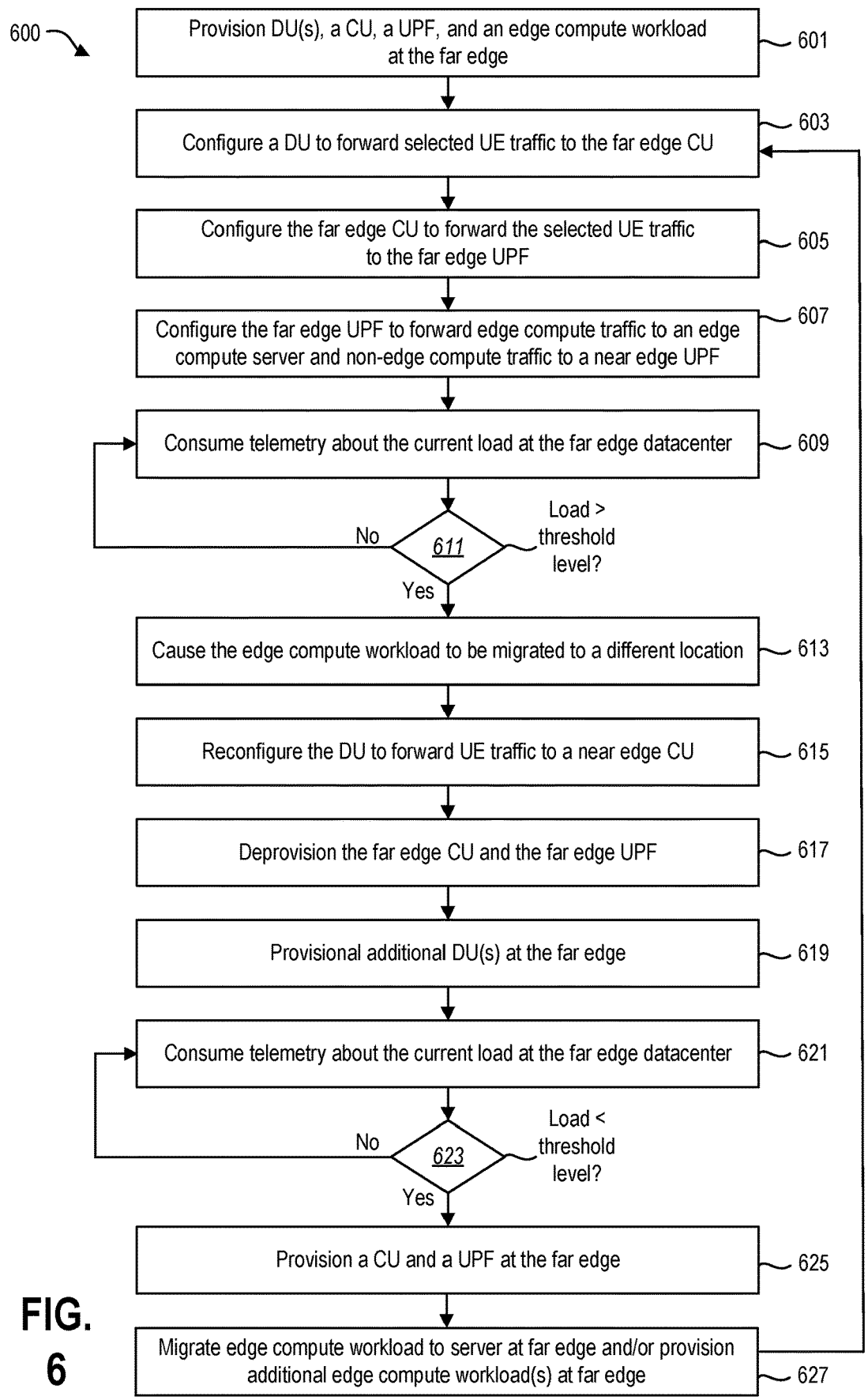
FIG. 6 illustrates an example of a method that involves dynamically reconfiguring a far edge installation based on its current load and dynamically relocating an edge compute workload based on a current load of a far edge installation.

FIG. 6 illustrates an example of a method 600 that can be performed in accordance with the present disclosure. The method 600 involves dynamically reconfiguring a far edge 520 based on its current load. More specifically, the method 600 involves dynamically relocating an edge compute workload 522 based on a current load being experienced at a far edge 520. The method 600 also involves dynamically modifying the behavior of a DU at the far edge 520 based on the migration of the edge compute workload 522. The method 600 will be described in relation to the example that was discussed above in connection with FIGS. 5A and 5B.

At 601, one or more DUs (e.g., the DUs 508-1, 508-2), a CU 506-1, a UPF 516-1, and an edge compute workload 522 are provisioned at the far edge 520. At 603, a DU (e.g., the DU 508-1) can be configured to forward selected UE traffic (e.g., traffic from a particular UE) to the far edge CU 506-1. In some embodiments, the DU can be configured in this manner in response to detecting that a UE has opened a connection to a far edge compute server, as discussed above. At 605, the far edge CU 506-1 can be configured to forward the selected UE traffic to the far edge UPF 516-1. At 607, the far edge UPF 516-1 can be configured to forward edge compute traffic to a far edge compute server (e.g., the server 540-3). The far edge UPF 516-1 can also be configured to forward non-edge compute traffic to a near edge UPF 516-2.

At 609, a scheduler can consume telemetry about the current load at the far edge 520. The telemetry can include one or more metrics related to the loading of the servers 540 at the far edge 520. In some embodiments, the telemetry can be specifically related to the loading of the DUs 508-1, 508-2 at the far edge 520.

At 611, the scheduler can be configured to determine whether the current load at the far edge 520 exceeds a threshold level. This determination can be based at least in part on the telemetry that the scheduler has consumed about the current load at the far edge 520. If the scheduler determines, based on the telemetry, that the current load at the far edge 520 does not exceed the threshold level, then the method 600 can return to 609 and the scheduler can continue to consume telemetry about the current load at the far edge 520.

However, if the scheduler determines, based on the telemetry, that the current load at the far edge 520 does exceed the threshold level, then at 613 the scheduler can cause the edge compute workload 522 to be migrated to a different location. For example, the scheduler can cause the edge compute workload 522 to be migrated to an edge compute server (e.g., the server 542) at a near edge 524. Alternatively, the edge compute workload 522 can be migrated to another location other than the near edge 524. As noted above, in some embodiments the edge compute workload 522 can be migrated to another far edge location.

At 615, the scheduler can reconfigure the DU to forward UE traffic to a near edge CU 506-2. At 617, the scheduler can deprovision the far edge CU 506-1 and the far edge UPF 516-1 in order to free up computing resources at the far edge 520 so that one or more additional DUs (e.g., the DU 508-3) can be provisioned at the far edge 520. At 619, the scheduler can provision one or more additional DUs at the far edge 520.

At 621, the scheduler can continue to consume telemetry about the current load at the far edge 520. At 623, the scheduler can be configured to determine whether the current load at the far edge 520 has fallen below a threshold level. In some embodiments, the threshold level that is used for the determination made at 623 can be different from (e.g., lower than) the threshold level that is used for the determination made at 611. Alternatively, in some embodiments, the threshold level that is used for the determination made at 623 can be the same as the threshold level that is used for the determination made at 611.

The determination made at 623 can be based at least in part on the telemetry that the scheduler has consumed about the current load at the far edge 520. If the scheduler determines, based on the telemetry, that the current load at the far edge 520 has fallen below the threshold level, then this indicates that there is available capacity at the far edge 520 to perform some edge computing tasks in addition to the signal processing operations performed by the DUs. At 625, a CU 506-1 and a UPF 516-1 can be provisioned at the far edge 520. At 627, the edge compute workload 522 can be migrated back to a server (e.g., the server 540-3) at the far edge 520. Alternatively, or in addition, one or more additional edge compute workload(s) can be provisioned at the far edge 520. The method 600 can then return to 603 and proceed as described above.

In the example shown in FIGS. 5A and 5B, it is assumed that when the edge compute workload 522 has been migrated to the near edge 524, the far edge CU 506-1 and the far edge UPF 516-1 are deprovisioned. In some embodiments, however, the far edge CU 506-1 and the far edge UPF 516-1 could still be maintained at the far edge 520 even after the edge compute workload 522 has been migrated to the near edge 524.

Figure 7A:
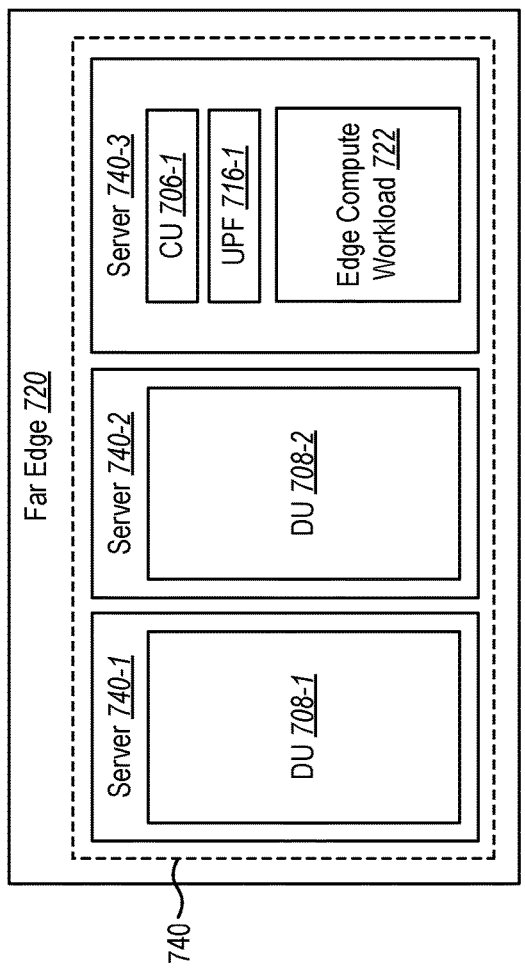
FIGS. 7A and 7B illustrate an example in which a far edge central unit and a far edge user plane function are maintained at a far edge installation after an edge compute workload has been migrated from the far edge installation to a near edge installation.
Figure 7B:
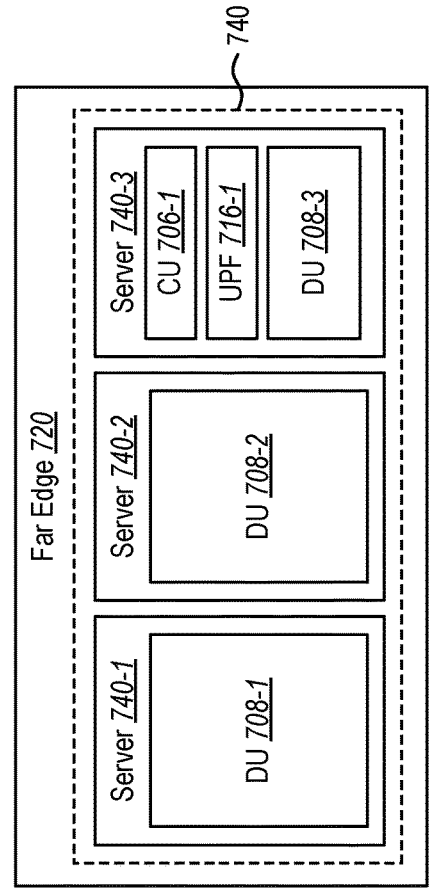
Figure 7B:
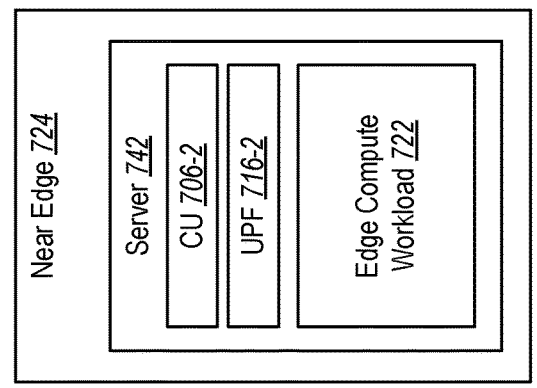

FIGS. 7A and 7B illustrate an example in which a far edge CU 706-1 and a far edge UPF 716-1 are maintained at a far edge 720 after an edge compute workload 722 has been migrated from the far edge 720 to a near edge 724. FIG. 7A shows the contents of a plurality of servers 740 at the far edge 720 at a first point in time ($t_1$). A first server 740-1 is running a first DU 708-1. A second server 740-2 is running a second DU 708-2. A third server 740-3 is running the far edge CU 706-1, the far edge UPF 716-1, and an edge compute workload 722. FIG. 7B shows the contents of the plurality of servers 740 at the far edge 720 at a second point in time ($t_2$), where $t_2$ occurs after $t_1$. As in the example discussed previously, it will be assumed that the load on the first DU 708-1 and the second DU 708-2 has increased significantly between $t_1$ and $t_2$. In response to the increase in the load, a scheduler decides to instantiate a third DU 708-3 on the third server 740-3 to ensure that the RAN has sufficient capacity to handle the current load. To make room for the third DU 708-3, the scheduler decides to migrate the edge compute workload 722 to a server 742 located at the near edge 724. The server 742 at the near edge 724 is also shown with a near edge CU 706-2 and a near edge UPF 716-2.

Unlike the example that was described above in connection with FIGS. 5A and 5B, in the example shown in FIGS. 7A and 7B the far edge CU 706-1 and the far edge UPF 716-1 are still maintained at the far edge 720 even after the edge compute workload 722 has been migrated to the near edge 724. The third DU 708-3 runs on the third server 740-3 along with the far edge CU 706-1 and the far edge UPF 716-1.

As in the example discussed previously, the behavior of one or more components at the far edge 720 can be dynamically modified based on the migration of the edge compute workload 722 from the far edge 720 to the near edge 724. However, the specific components whose behavior is modified can be different than in the previous example. In particular, in the depicted embodiment, it is the behavior of the far edge UPF 716-1 that can be changed. At time $t_1$, a DU (e.g., the first DU 708-1) that is receiving transmissions from a particular UE can be configured to forward uplink traffic from the UE to the far edge CU 706-1. The far edge CU 706-1 can be configured to forward the uplink UE traffic to the far edge UPF 716-1. The far edge UPF 716-1 can be configured to classify the uplink UE traffic into edge compute traffic and non-edge compute traffic, forward the edge compute traffic to the far edge compute server (e.g., the server 740-3), and forward the non-edge compute traffic to the near edge UPF 716-2. At time $t_2$, because the edge compute workload 722 has been migrated to the near edge 724, the far edge UPF 716-1 can be reconfigured so that it forwards all uplink traffic from the UE (including both the edge compute traffic and the non-edge compute traffic) to the near edge UPF 716-2.

Figure 8:
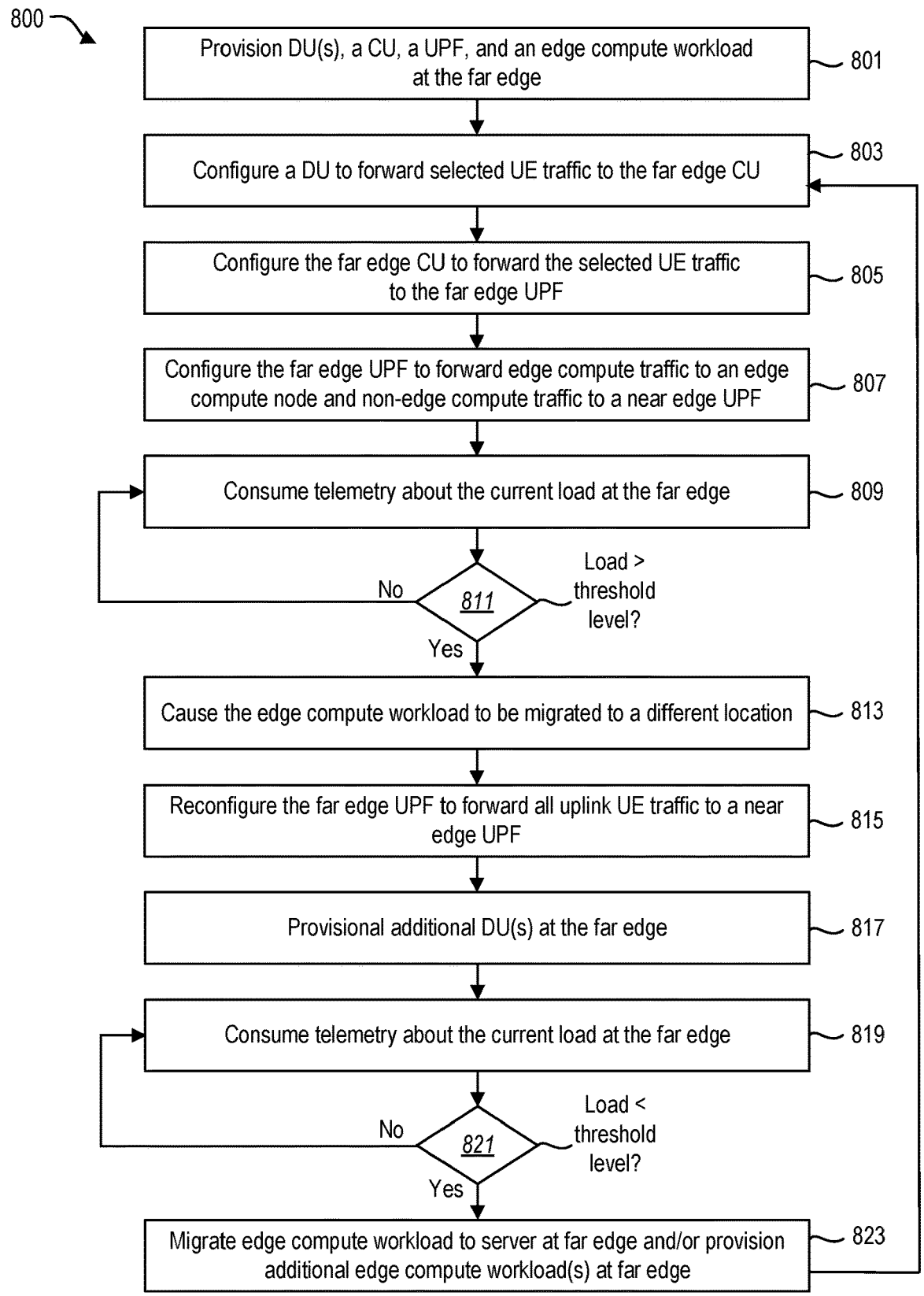
FIG. 8 illustrates another example of a method that involves dynamically relocating an edge compute workload based on a current load of a far edge installation and dynamically modifying the behavior of a far edge user plane function based on the migration of the edge compute workload.

FIG. 8 illustrates another example of a method 800 that can be performed in accordance with the present disclosure. The method 800 involves dynamically relocating an edge compute workload 722 based on a current load of a far edge 720. The method 800 also involves dynamically modifying the behavior of a far edge UPF 716-1 based on the migration of the edge compute workload 722. The method 800 will be described in relation to the example that was discussed above in connection with FIGS. 7A and 7B.

At 801, one or more DUs (e.g., the DUs 708-1, 708-2), a CU 706-1, a UPF 716-1, and an edge compute workload 722 are provisioned at the far edge 720. At 803, a DU (e.g., the DU 708-1) can be configured to forward selected UE traffic (e.g., traffic from a particular UE) to the far edge CU 706-1. In some embodiments, the DU can be configured in this manner in response to detecting that a UE has opened a connection to a far edge compute server, as discussed above. At 805, the far edge CU 706-1 can be configured to forward the UE traffic to the far edge UPF 716-1. At 807, the far edge UPF 716-1 can be configured to forward edge compute traffic to the far edge compute server (e.g., the server 740-3). The far edge UPF 716-1 can also be configured to forward non-edge compute traffic to a near edge UPF 716-2.

At 809, a scheduler can consume telemetry about the current load at the far edge 720. At 811, the scheduler can be configured to determine whether the current load at the far edge 720 exceeds a threshold level. This determination can be based at least in part on the telemetry that the scheduler has consumed about the current load at the far edge 720. If the scheduler determines, based on the telemetry, that the current load at the far edge 720 does not exceed the threshold level, then the method 800 can return to 809 and the scheduler can continue to consume telemetry about the current load at the far edge 720.

However, if the scheduler determines, based on the telemetry, that the current load at the far edge 720 does exceed the threshold level, then at 813 the scheduler can cause the edge compute workload 722 to be migrated to a different location. For example, the scheduler can cause the edge compute workload 722 to be migrated to an edge compute server (e.g., the server 742) at a near edge 724. Alternatively, the edge compute workload 722 can be migrated to another location other than the near edge 724. As noted above, in some embodiments the edge compute workload 722 can be migrated to another far edge location.

At 815, the scheduler can reconfigure the far edge UPF 716-1 to forward all uplink UE traffic to the near edge UPF 716-2. At 817, the scheduler can provision one or more additional DUs (e.g., the DU 708-3) at the far edge 720.

At 819, the scheduler can continue to consume telemetry about the current load at the far edge 720. At 821, the scheduler can be configured to determine whether the current load at the far edge 720 has fallen below the threshold level. In some embodiments, the threshold level that is used for the determination made at 821 can be different from (e.g., lower than) the threshold level that is used for the determination made at 811. Alternatively, in some embodiments, the threshold level that is used for the determination made at 821 can be the same as the threshold level that is used for the determination made at 811.

The determination made at 821 can be based at least in part on the telemetry that the scheduler has consumed about the current load at the far edge 720. If the scheduler determines, based on the telemetry, that the current load at the far edge 720 has fallen below the threshold level, then at 823 the edge compute workload 722 can be migrated back to a server (e.g., the server 740-3) at the far edge 720. Alternatively, or in addition, one or more additional edge compute workload(s) can be provisioned at the far edge 720. The method 800 can then return to 803 and proceed as described above.

As discussed above, the present disclosure is generally related to techniques for improving the efficiency of routing traffic to an edge compute server at the far edge of a cellular network. In the embodiments discussed to this point, the disclosed techniques have involved identifying the destination IP address in the UE traffic. However, the scope of the present disclosure is not limited to these specific embodiments. In alternative embodiments, the routing efficiency can be improved in other ways that do not require the destination IP address to be identified.

Figure 9:
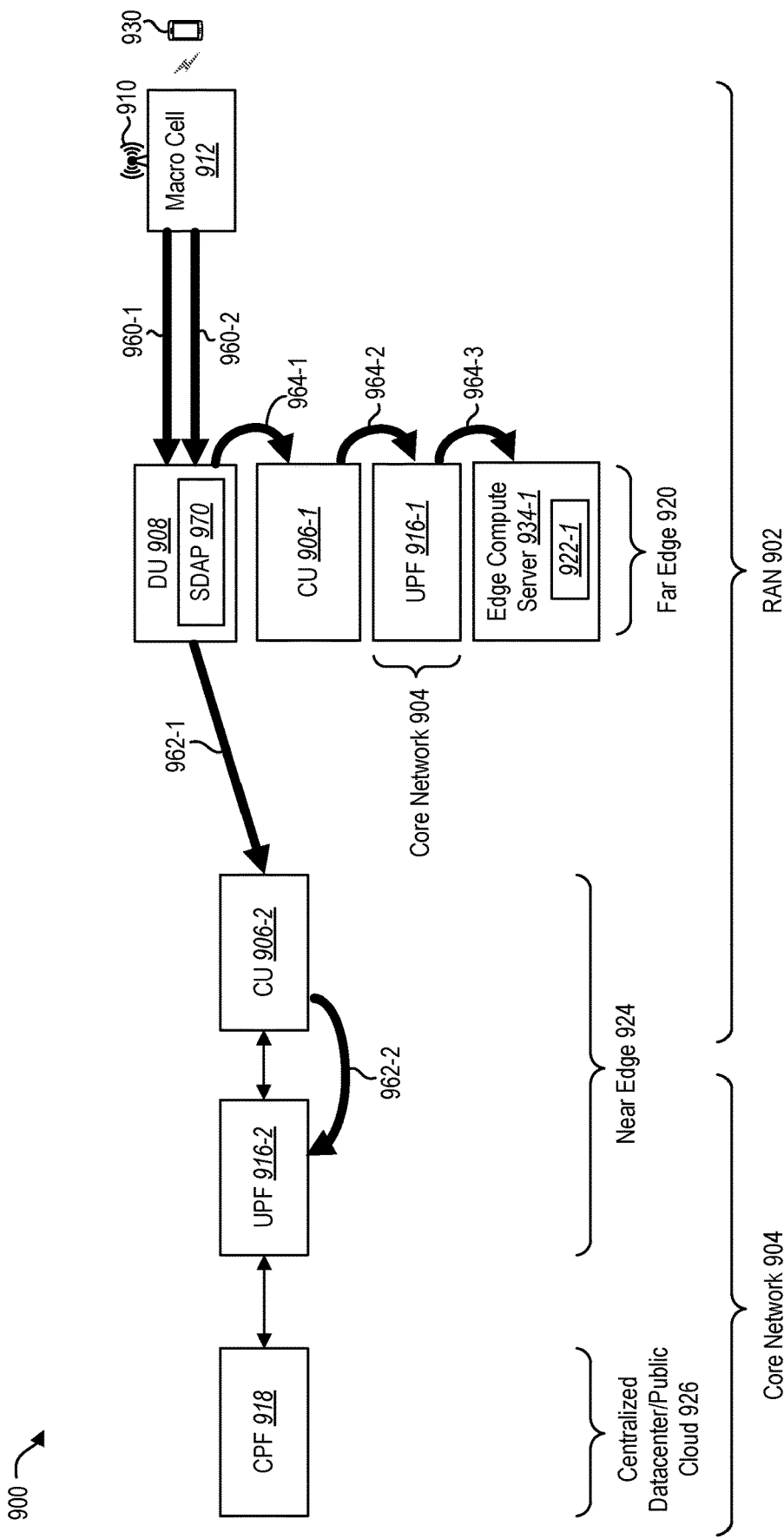
FIG. 9 illustrates an example of a cellular network in which selected UE traffic can be routed to an edge compute server at the far edge of the cellular network by allocating a separate data radio bearer for the edge compute traffic.

For example, in some embodiments, selected UE traffic can be routed to an edge compute server at the far edge of a cellular network by allocating a separate data radio bearer for the edge compute traffic. FIG. 9 illustrates an example of a cellular network 900 that is configured in this manner.

The cellular network 900 includes a RAN 902 and a core network 904. The RAN 902 includes a DU 908 at a far edge 920. The RAN 902 also includes a CU 906-1 at the far edge 920 as well as a CU 906-2 at a near edge 924. In addition, the core network 904 includes a UPF 916-1 at the far edge 920 in addition to a UPF 916-2 at the near edge 924. The core network 904 also includes a CPF 918 that is hosted in a centralized datacenter/public cloud 926.

An edge compute workload 922-1 is shown on an edge compute server 934-1 at the far edge 920. In order to improve the efficiency of routing UE traffic to that edge compute server 934-1, a separate data radio bearer can be allocated for the edge compute traffic.

FIG. 9 shows a UE 930 that is wirelessly connected to a macro cell 912 that is served by a radio unit (RU) 910. FIG. 9 also shows two different arrows 960-1, 960-2 from the macro cell 912 (served by the RU 910) to the DU 908. These different arrows 960-1, 960-2 represent different data radio bearers that have been allocated for the UE 930. These data radio bearers include a data radio bearer 960-1 for non-edge compute traffic (e.g., general purpose traffic) and a data radio bearer 960-2 for edge compute traffic.

In the depicted embodiment, the UE 930 decides which data radio bearer to use for the traffic that it wants to send. If the UE 930 has traffic for the edge compute workload 922-1, the UE 930 can send that traffic via the data radio bearer 960-2 that is specifically allocated for edge compute traffic. If the UE 930 has non-edge compute traffic to send, the UE 930 can send that via the general purpose data radio bearer 960-1.

The DU 908 receives UE traffic from the RU 910. In the depicted embodiment, the DU 908 can be configured to distinguish between edge compute traffic and non-edge compute traffic. For example, the service data adaptation protocol (SDAP) layer 970 at the DU 908 can distinguish between edge compute traffic and non-edge compute traffic. In some embodiments, the SDAP layer 970 can distinguish between edge compute traffic and non-edge compute traffic by performing cross-layer optimization. In other words, the SDAP layer 970 can examine data packet headers that are at higher layers of the protocol stack and make a decision about whether the data packets correspond to edge compute traffic or non-edge compute traffic based on the information contained in those higher layer headers.

The SDAP layer 970 can route the non-edge compute traffic differently than the edge compute traffic. In other words, there are two different traffic paths shown in FIG. 9: a first traffic path for non-edge compute traffic, and a second traffic path for edge compute traffic.

The UE 930 sends the non-edge compute traffic via the general purpose data radio bearer 960-1. The SDAP layer 970 at the DU 908 forwards the non-edge compute traffic to the near edge CU 906-2 (as shown by the arrow 962-1). The near edge CU 906-2 forwards the non-edge compute traffic to the near edge UPF 916-2 (as shown by the arrow 962-2). The near edge UPF 916-2 forwards the non-edge compute traffic on the way to its ultimate destination.

The UE 930 sends the edge compute traffic via the data radio bearer 960-2 that is associated with the edge compute traffic. The SDAP layer 970 at the DU 908 forwards the edge compute traffic to the far edge CU 906-1 (as shown by the arrow 964-1). The far edge CU 906-1 forwards the edge compute traffic to the far edge UPF 916-1 (as shown by the arrow 964-2). The far edge UPF 916-1 forwards the edge compute traffic to the edge compute server 934-1 (as shown by the arrow 964-3).

Thus, in the embodiment shown in FIG. 9, identifying the edge compute traffic includes determining that a particular IP flow corresponds to a data radio bearer that is associated with (or dedicated to) the edge compute traffic. When the SDAP layer 970 determines that a particular IP flow corresponds to a data radio bearer that is associated with (or dedicated to) the edge compute traffic, the SDAP layer 970 can infer that the IP flow is edge compute traffic that should be forwarded to the edge compute server 934-1.

As in the embodiments discussed previously, the edge compute workload 922-1 can be relocated to the near edge 924 or to another location (e.g., another far edge location). When the edge compute workload 922-1 is relocated to another location, the data radio bearer that is associated with the edge compute workload 922-1 can be relocated as well.

Figure 10:
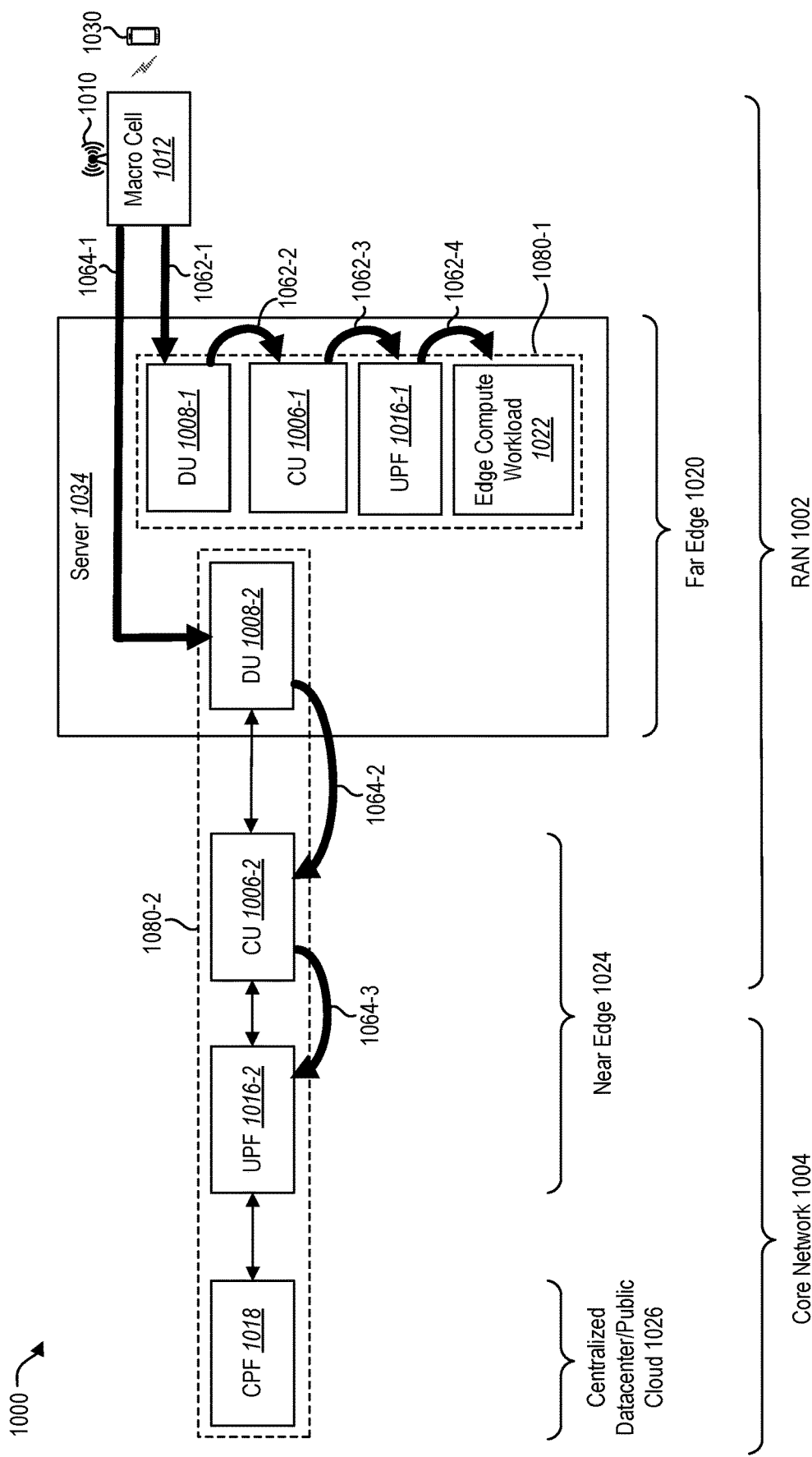
FIG. 10 illustrates an example of a cellular network in which selected UE traffic can be routed to an edge compute server at the far edge of the cellular network by allocating a separate network slice for the edge compute traffic.

In some embodiments, selected UE traffic can be routed to an edge compute server at the far edge of a cellular network by allocating a separate network slice for the edge compute traffic. FIG. 10 illustrates an example of a cellular network 1000 that is configured in this manner.

The cellular network 1000 includes a RAN 1002 and a core network 1004. The RAN 1002 includes a first DU 1008-1 and a second DU 1008-2 at a far edge 1020. The first DU 1008-1 belongs to a first network slice 1080-1. The second DU 1008-2 belongs to a second network slice 1080-2.

The RAN 1002 also includes a CU 1006-1 at the far edge 1020 as well as a CU 1006-2 at a near edge 1024. The CU 1006-1 at the far edge 1020 belongs to the first network slice 1080-1. The CU 1006-2 at the near edge 1024 belongs to the second network slice 1080-2.

The core network 1004 includes a UPF 1016-1 at the far edge 1020 in addition to a UPF 1016-2 at the near edge 1024. The UPF 1016-1 at the far edge 1020 belongs to the first network slice 1080-1. The UPF 1016-2 at the near edge 1024 belongs to the second network slice 1080-2.

The core network 1004 also includes a CPF 1018 that is hosted in a centralized datacenter/public cloud 1026.

The DUs 1008-1, 1008-2, the far edge CU 1006-1, and the far edge UPF 1016-1 are shown running on a server 1034 at the far edge 1020. An edge compute workload 1022 is also shown running on the server 1034.

The separate network slices 1080-1, 1080-2 can be utilized to improve the efficiency of routing UE traffic to the edge compute workload 1022 on the server 1034 at the far edge 1020. The first network slice 1080-1 is intended for edge compute traffic (e.g., traffic intended for the edge compute workload 1022 at the far edge 1020). The second network slice 1080-2 is intended for non-edge compute traffic.

FIG. 10 shows a UE 1030 that is wirelessly connected to a macro cell 1012 that is served by a radio unit (RU) 1010. FIG. 10 also shows two different arrows 1062-1, 1064-1 from the macro cell 1012 (served by the RU 1010) to the far edge 1020. These different arrows 1062-1, 1064-1 represent different traffic paths corresponding to the different network slices 1080-1, 1080-2.

The UE 1030 decides which network slice to use for the traffic that it wants to send. If the UE 1030 has traffic for the edge compute workload 1022, the UE 1030 can send that traffic via the network slice 1080-1 that is specifically allocated for edge compute traffic. If the UE 1030 has non-edge compute traffic to send, the UE 1030 can send that via the network slice 1080-2 that corresponds to non-edge compute traffic.

The DU 1008-1 in the first network slice 1080-1 receives edge compute traffic from the UE 1030 via the RU 1010 (as shown by the arrow 1062-1). The DU 1008-1 forwards the edge compute traffic to the far edge CU 1006-1 (as shown by the arrow 1062-2). The far edge CU 1006-1 forwards the edge compute traffic to the far edge UPF 1016-1 (as shown by the arrow 1062-3). The far edge UPF 1016-1 forwards the edge compute traffic to the edge compute workload 1022 (as shown by the arrow 1062-4).

The DU 1008-2 in the second network slice 1080-2 receives non-edge compute traffic from the UE 1030 via the RU 1010 (as shown by the arrow 1064-1). The DU 1008-2 forwards the non-edge compute traffic to the near edge CU 1006-2 (as shown by the arrow 1064-2). The near edge CU 1006-2 forwards the non-edge compute traffic to the near edge UPF 1016-2 (as shown by the arrow 1064-3).

Thus, in the embodiment shown in FIG. 10, identifying the edge compute traffic includes receiving the edge compute traffic at a network slice that is associated with (or dedicated to) the edge compute traffic. The network slice 1080-1 is dedicated to the edge compute traffic, so the DU 1008-1 that is part of that network slice 1080-1 knows that all UE traffic that it receives is edge compute traffic.

The server 1034 shown in FIG. 10 can be a physical computing device. Thus, the DUs 1008-1, 1008-2, the far edge CU 1006-1, the far edge UPF 1016-1, and the edge compute workload 1022 can all run on the same physical computing device. In an alternative embodiment, the DUs 1008-1, 1008-2, the far edge CU 1006-1, the far edge UPF 1016-1, and the edge compute workload 1022 can run on a combination of servers (e.g., a combination of physical computing devices) at the far edge 1020.

Figure 11:
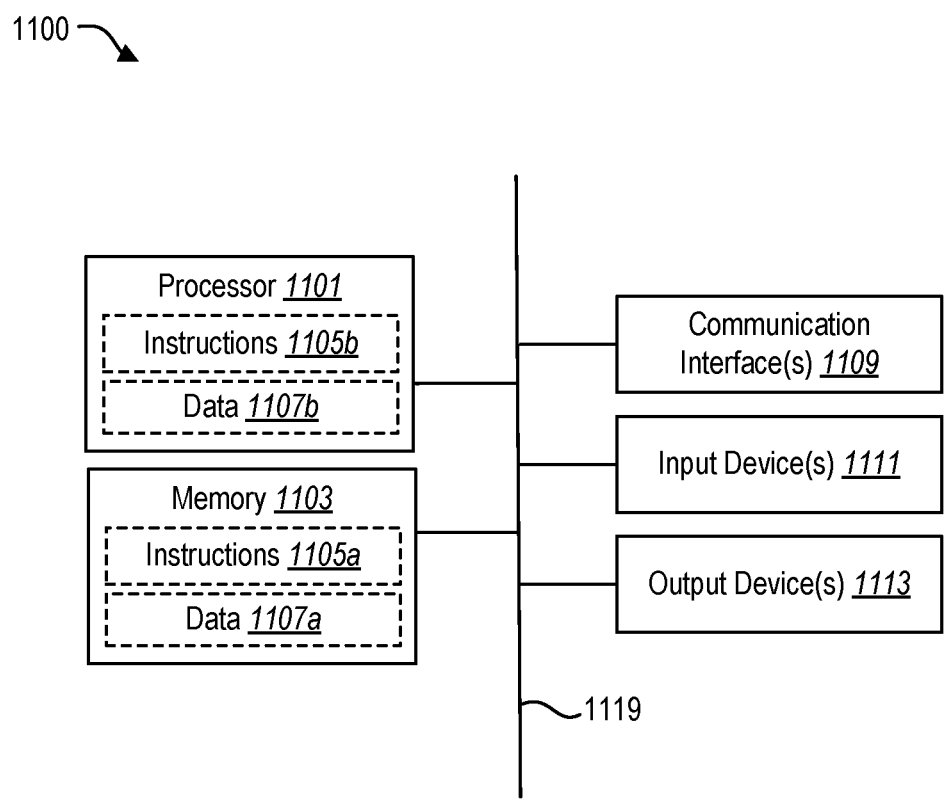
FIG. 11 illustrates certain components that can be included within a computer system that can be used to implement the actions and operations described herein.

FIG. 11 illustrates certain components that can be included within a computer system 1100 that can be used to implement the actions and operations described herein. In some embodiments, a plurality of computer systems 1100 can collectively implement the actions and operations described herein.

The computer system 1100 includes a processor 1101 and memory 1103 in electronic communication with the processor 1101. Instructions 1105a and data 1107a can be stored in the memory 1103. The instructions 1105a can be executable by the processor 1101 to implement some or all of the methods, steps, operations, actions, or other functionality disclosed herein. Executing the instructions 1105a can involve the use of the data 1107a that is stored in the memory 1103. When the processor 1101 executes the instructions 1105a, various instructions 1105b can be loaded onto the processor 1101, and various pieces of data 1107b can be loaded onto the processor 1101.

Unless otherwise specified, any of the various examples of modules and components described herein can be implemented, partially or wholly, as instructions 1105a stored in memory 1103 and executed by the processor 1101. Any of the various examples of data described herein can be among the data 1107a that is stored in memory 1103 and used during execution of the instructions 1105a by the processor 1101.

Although just a single processor 1101 and a single memory 1103 are shown in the computer system 1100 of FIG. 11, in an alternative configuration, a combination of processors and/or a combination of memory devices could be used.

The instructions 1105a in the memory 1103 can be executable by the processor 1101 to perform some or all aspects of the methods that have been described herein, such as the methods 300, 400, 600, 800 shown in FIGS. 3A-B, FIGS. 4A-B, FIG. 6, and FIG. 8. The data 1107a stored in the memory 1103 can include any of the various examples of data described herein, including any data that is stored, accessed, or otherwise used in connection with the methods that have been described herein.

The computer system 1100 can also include various other components, including one or more communication interfaces 1109, one or more input devices 1111, and one or more output devices 1113.

The communication interface(s) 1109 can be configured to communicate with other computing systems and/or networking devices. This includes receiving data transmissions from other computing systems and/or networking devices, and also sending data transmissions to other computing systems and/or networking devices. The communication interface(s) 1109 can be based on wired communication technology, wireless communication technology, or both. Some examples of communication interfaces 1109 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

The various components of the computer system 1100 can be coupled together by one or more buses, which can include a power bus, a control signal bus, a status signal bus, a data bus, etc. For simplicity, the various buses are illustrated in FIG. 11 as a bus system 1119.

Figure 12:
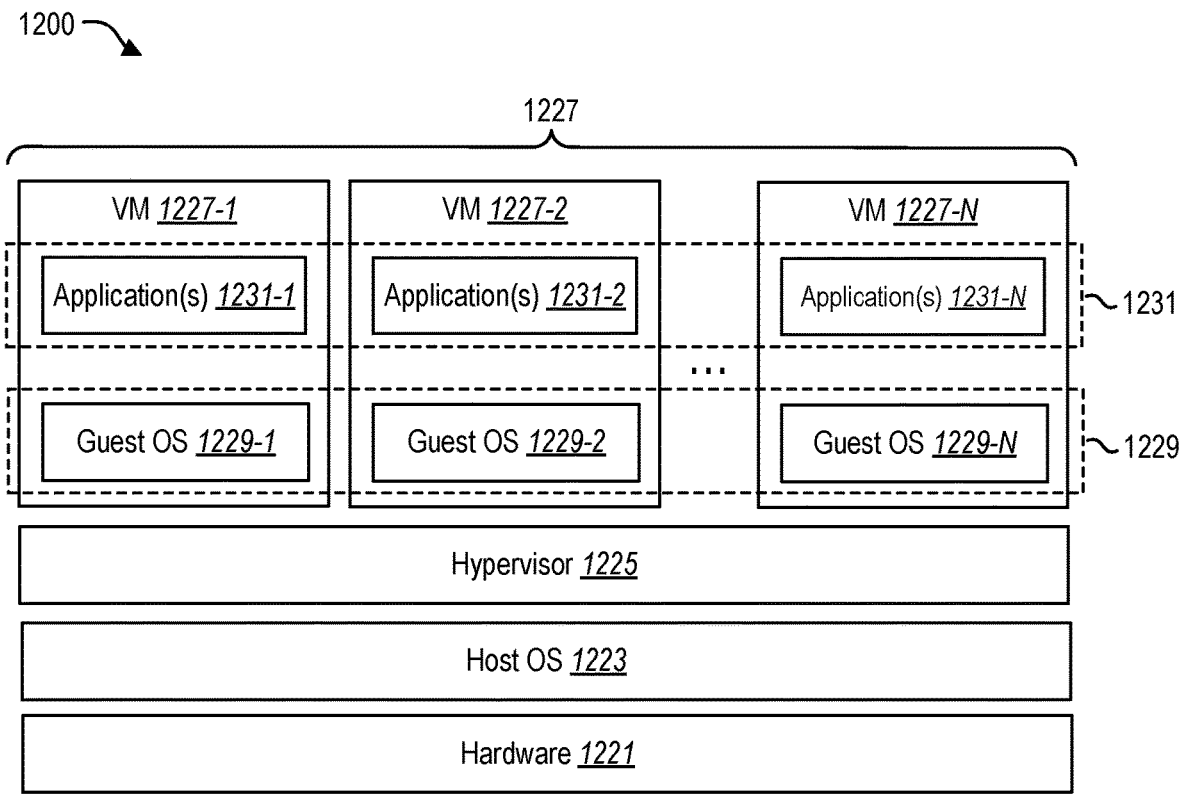
FIG. 12 illustrates an example of a software architecture that can be utilized by a computer system in accordance with the present disclosure.

Various components that have been described herein can be implemented on a computer system such as the computer system 1200 shown in FIG. 12.

FIG. 12 illustrates an example of a software architecture that can be utilized by a computer system 1200 in accordance with the present disclosure.

The computer system 1200 can include various hardware 1221. The hardware 1221 can include some or all of the hardware components that are shown in the computer system 1100 depicted in FIG. 11.

The computer system 1200 can also include a host operating system (OS) 1223. The host OS 1223 manages the hardware 1221 and software resources of the computer system 1200 and provides common services for computer programs. After being loaded into memory by a boot program, the host OS 1223 manages the other programs running on the computer system 1200. For certain functions performed by the hardware 1221 (e.g., input and output and memory allocation), the host OS 1223 can act as an intermediary between programs and the hardware 1221. The host OS 1223 enables programs to interact with the hardware 1221 without needing to know specific details about the hardware 1221.

The computer system 1200 can also include a hypervisor 1225. The hypervisor 1225 is software that creates and runs virtual machines (VMs) 1227. The hypervisor 1225 allows the computer system 1200 to support a plurality of VMs 1227 by virtually sharing the hardware 1221 resources (e.g., processing and memory) of the computer system 1200.

Each VM 1227 is a program running on the computer system 1200 that acts like a virtual computer. Like a physical computer, a VM 1227 runs an operating system, which may be referred to as a guest operating system (OS) 1229. A VM 1227 can also run one or more applications 1231. The computer system 1200 depicted in FIG. 12 includes VM 1227-1, VM 1227-2, and VM 1227-N. VM 1227-1 runs guest OS 1229-1 and application(s) 1231-1. VM 1227-2 runs guest OS 1229-2 and application(s) 1231-2. VM 1227-N runs guest OS 1229-N and application(s) 1231-N.

In some embodiments, various components that have been described herein can be implemented using one or more applications 1231 running on one or more VMs 1227. For example, referring to the cellular network 200 shown in FIG. 2, the DUs 208-1, 208-2, the CU 206-1, the UPF 216-1, and the process(es) that execute the edge compute workload 222-1 can be implemented using one or more applications 1231 running on one or more VMs 1227, and the VM(s) 1227 can run on one or more computer systems 1200 (e.g., servers) located at one or more far edges 220. Similarly, the CU 206-2, UPF 216-2, and process(es) that execute the edge compute workload 222-2 can be implemented using one or more applications 1231 running on one or more VMs 1227, and the VM(s) 1227 can run on one or more computer systems 1200 (e.g., servers) located at one or more near edges 224. Similarly, the CPF 218 can be implemented using one or more applications 1231 running on one or more VMs 1227, and the VM(s) 1227 can run on one or more computer systems 1200 (e.g., servers) located at a centralized datacenter/public cloud 226.

Figure 13:
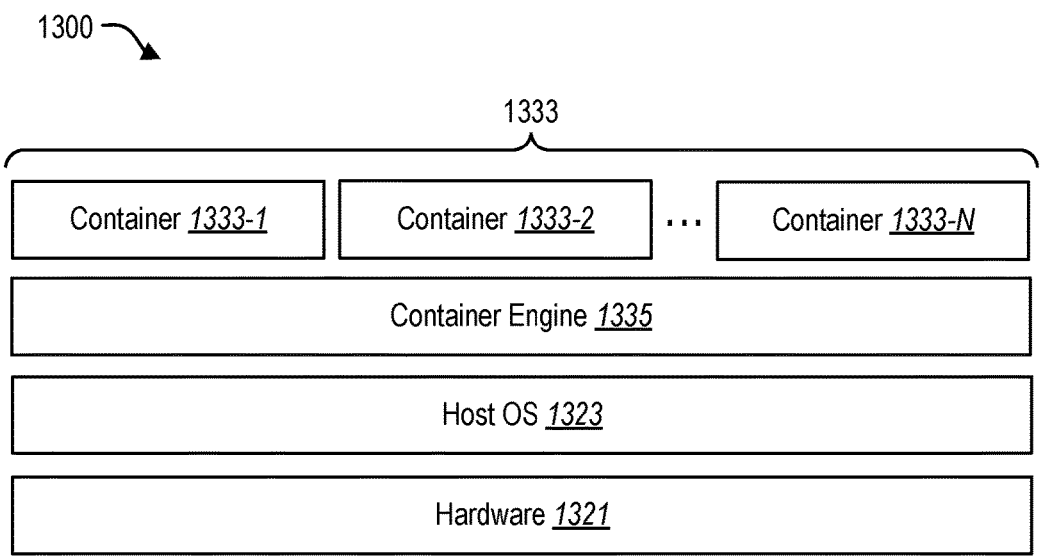
FIG. 13 illustrates another example of a software architecture that can be utilized by a computer system in accordance with the present disclosure.

FIG. 13 illustrates another example of a software architecture that can be utilized by a computer system 1300 in accordance with the present disclosure.

The computer system 1300 can include various hardware 1321. The hardware 1321 can include some or all of the hardware components that are shown in the computer system 1100 depicted in FIG. 11.

The computer system 1300 can also include a host operating system (OS) 1323. The host OS 1323 can be similar to the host OS 1223 in the computer system 1200 depicted in FIG. 12.

The computer system 1300 shown in FIG. 13 utilizes a plurality of containers 1333, including container 1333-1, container 1333-2, and container 1333-N. The containers 1333 can be managed by a container engine 1335.

As discussed above, containerization is an approach to software development in which an application and everything that it needs, such as libraries and other dependencies, are packaged together as a standard unit that is referred to as a container image. When a container image is deployed, it is referred to as a container. The use of containers allows applications to run properly in a variety of different computing environments, regardless of any customized settings that a particular computing environment might have that could differ from the computing environment used for writing and testing the application. Containers also isolate applications from one another on a shared operating system. Containers provide most of the isolation of virtual machines at a small fraction of the computing power.

In some embodiments, various components that have been described herein can be implemented using one or more containers 1333 running on one or more computer systems 1300. For example, referring to the cellular network 200 shown in FIG. 2, the DUs 208-1, 208-2, the CU 206-1, the UPF 216-1, and the process(es) that execute the edge compute workload 222-1 can be implemented using one or more containers 1333 running on one or more computer systems 1300 (e.g., servers) located at one or more far edges 220. Similarly, the CU 206-2, UPF 216-2, and the process(es) that execute the edge compute workload 222-2 can be implemented using one or more containers 1333 running on one or more computer systems 1300 (e.g., servers) located at one or more near edges 224. Similarly, the CPF 218 can be implemented using one or more containers 1333 running on one or more computer systems 1300 (e.g., servers) located at a centralized datacenter/public cloud 226.

The techniques disclosed herein can be implemented in hardware, software, firmware, or any combination thereof, unless specifically described as being implemented in a specific manner. Any features described as modules, components, or the like can also be implemented together in an integrated logic device or separately as discrete but interoperable logic devices. If implemented in software, the techniques can be realized at least in part by a non-transitory computer-readable medium having computer-executable instructions stored thereon that, when executed by at least one processor, perform some or all of the steps, operations, actions, or other functionality disclosed herein. The instructions can be organized into routines, programs, objects, components, data structures, etc., which can perform particular tasks and/or implement particular data types, and which can be combined or distributed as desired in various embodiments.

The term "processor" should be interpreted broadly to encompass a general-purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a digital signal processor (DSP) and a microprocessor, a plurality of microprocessors, one or more microprocessors in conjunction with a digital signal processor (DSP) core, or any other such configuration.

The term "memory" should be interpreted broadly to encompass any electronic component capable of storing electronic information. The term "memory" may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The term "communicatively coupled" refers to coupling of components such that these components are able to communicate with one another through, for example, wired, wireless, or other communications media. The term "communicatively coupled" can include direct, communicative coupling as well as indirect or "mediated" communicative coupling. For example, a component A may be communicatively coupled to a component B directly by at least one communication pathway, or a component A may be communicatively coupled to a component B indirectly by at least a first communication pathway that directly couples component A to a component C and at least a second communication pathway that directly couples component C to component B. In this case, component C is said to mediate the communicative coupling between component A and component B.

The term "determining" (and grammatical variants thereof) can encompass a wide variety of actions. For example, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there can be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The phrase "based on" does not mean "based only on," unless expressly specified otherwise. In other words, the phrase "based on" describes both "based only on" and "based at least on."

The steps, operations, and/or actions of the methods described herein may be interchanged with one another without departing from the scope of the claims. In other words, unless a specific order of steps, operations, and/or actions is required for proper functioning of the method that is being described, the order and/or use of specific steps, operations, and/or actions may be modified without departing from the scope of the claims.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. In a fifth generation (5G) cellular network including a core network, a radio access network (RAN), and an edge portion having a near edge and a far edge, a method for improving efficiency of routing edge compute traffic from a user equipment (UE) to an edge compute server at the far edge, the method comprising:
   provisioning a near edge control unit (CU) and a near edge user plane function (UPF) at the near edge of the edge portion of the 5G cellular network in response to detecting under-utilized computing resources at the far edge, components of the near edge being implemented on a first set of servers being located closer to the radio units of the RAN than a datacenter that hosts one or more components of the core network;
   provisioning a far edge CU, a far edge UPF, and an edge compute workload at the far edge of the edge portion of the 5G cellular network, components of the far edge being implemented on a second set of servers being located closer to radio units of the RAN than the first set of servers of the near edge;
   receiving UE traffic at one or more distributed units on the second set of servers of the far edge, the UE traffic comprising edge compute traffic and non-edge compute traffic;
   identifying the edge compute traffic among the UE traffic;
   routing the edge compute traffic of the UE traffic to the edge compute workload on the second set of servers at the far edge;
   routing the non-edge compute traffic of the UE traffic to the near edge UPF on the first set of servers at the near edge;
   consuming telemetry of a current load at the far edge based on physical layer processing operations performed by one or more distributed units on the far edge;
   detecting, based on the telemetry, that the current load at the second set of servers at the far edge exceeds a first threshold level; and
   in response to determining that the current load at the second set of servers at the far edge exceeds the first threshold level:
      causing the edge compute workload at the second set of servers at the far edge to be migrated to the first set of servers at the near edge; and
      deprovisioning the far edge CU, the far edge UPF, and the edge compute workload at the far edge.

2. The method of claim 1, wherein identifying the edge compute traffic comprises:
   identifying a destination Internet protocol (IP) address in data packets corresponding to an IP flow; and
   determining that the destination IP address corresponds to a far edge compute server from the second set of servers.

3. The method of claim 1, wherein identifying the edge compute traffic comprises determining that an Internet protocol (IP) flow corresponds to a data radio bearer that is dedicated to the edge compute traffic.

4. The method of claim 1, wherein identifying the edge compute traffic comprises receiving the edge compute traffic at a network slice that is dedicated to the edge compute traffic.

5. The method of claim 1, wherein the edge compute server comprises the edge compute workload, and further comprising:
   detecting, at the near edge UPF, that the UE has opened a connection to the edge compute server; and
   in response to detecting that the UE has opened the connection to the edge compute server:
      configuring a distributed unit (DU) at the far edge to forward the UE traffic to the far edge UPF instead of the near edge UPF; and
      configuring the far edge UPF to forward the edge compute traffic to the edge compute server.

6. The method of claim 5, further comprising configuring the far edge UPF to:
   classify the UE traffic into the edge compute traffic and the non-edge compute traffic; and
   forward the non-edge compute traffic to the near edge UPF.

7. The method of claim 5, wherein all uplink traffic from the UE is forwarded to the far edge UPF after the DU has been configured to forward the UE traffic to the far edge UPF.

8. The method of claim 5, wherein detecting that the UE has opened the connection to the edge compute server comprises identifying an Internet protocol (IP) flow comprising data packets in which a destination IP address corresponds to the edge compute server.

9. The method of claim 5, further comprising:
   detecting, at the far edge UPF, that the connection between the UE and the far edge compute server is closed; and
   reconfiguring the DU to forward the UE traffic to the near edge UPF.

10. In a fifth generation (5G) cellular network including a core network, a radio access network (RAN), and an edge portion having a near edge and a far edge, a system for improving efficiency of routing edge compute traffic from a user equipment (UE) to an edge compute server at the far edge, the system comprising:
   one or more processors;
   memory in electronic communication with the one or more processors; and
   instructions stored in the memory, the instructions being executable by the one or more processors to:

provision a near edge control unit (CU) and a near edge user plane function (UPF) at the near edge of the edge portion of the 5G cellular network in response to detecting under-utilized computing resources at the far edge, components of the near edge being implemented on a first set of servers being located closer to the radio units of the RAN than a datacenter that hosts one or more components of the core network;

provision a far edge CU, a far edge UPF, and an edge compute workload at the far edge of the edge portion of the 5G cellular network, components of the far edge being implemented on a second set of servers being located closer to radio units of the RAN than the first set of servers of the near edge;

receive UE traffic at one or more distributed units on the second set of servers of the far edge, the UE traffic comprising edge compute traffic and non-edge compute traffic;

identify the edge compute traffic among the UE traffic;

route the edge compute traffic of the UE traffic to the edge compute workload on the second set of servers at the far edge;

route the non-edge compute traffic of the UE traffic to the near edge UPF on the first set of servers at the near edge;

consume telemetry of a current load at the far edge based on physical layer processing operations performed by one or more distributed units on the far edge;

detect, based on the telemetry, that the current load at the second set of servers at the far edge exceeds a first threshold level; and in response to determining that the current load at the second set of servers at the far edge exceeds the first threshold level:
cause the edge compute workload at the second set of servers at the far edge to be migrated to the first set of servers at the near edge; and
deprovision the far edge CU, the far edge UPF, and the edge compute workload at the far edge.

11. The system of claim 10, wherein identifying the edge compute traffic comprises:
identifying a destination Internet protocol (IP) address in data packets corresponding to an IP flow; and
determining that the destination IP address corresponds to a far edge compute server from the second set of servers.

12. The system of claim 10, wherein identifying the edge compute traffic comprises determining that an Internet protocol (IP) flow corresponds to a data radio bearer that is dedicated to the edge compute traffic.

13. The system of claim 10, wherein identifying the edge compute traffic comprises receiving the edge compute traffic at a network slice that is dedicated to the edge compute traffic.

14. The system of claim 10, wherein the edge compute server comprises the edge compute workload, and further comprising:
detecting, at the near edge UPF, that the UE has opened a connection to the edge compute server; and
in response to detecting that the UE has opened the connection to the edge compute server:
configuring a distributed unit (DU) at the far edge to forward the UE traffic to the far edge UPF instead of the near edge UPF; and
configuring the far edge UPF to forward the edge compute traffic to the edge compute server.

15. The system of claim 14, further comprising instructions being executable by the one or more processors to:
classify the UE traffic into the edge compute traffic and the non-edge compute traffic; and
forward the non-edge compute traffic to the near edge UPF.

16. The system of claim 14, wherein all uplink traffic from the UE is forwarded to the far edge UPF after the DU has been configured to forward the UE traffic to the far edge UPF.

17. The system of claim 14, wherein detecting that the UE has opened the connection to the edge compute server comprises identifying an Internet protocol (IP) flow comprising data packets in which a destination IP address corresponds to the edge compute server.

18. The system of claim 14, further comprising instructions being executable by the one or more processors to:
detect, at the far edge UPF, that the connection between the UE and the far edge compute server is closed; and
reconfigure the DU to forward the UE traffic to the near edge UPF.

19. In a fifth generation (5G) cellular network including a core network, a radio access network (RAN), and an edge portion having a near edge and a far edge, a non-transitory computer readable medium storing instructions thereon that, when executed by at least one processor, causes one or more computing devices to:
provision a near edge control unit (CU) and a near edge user plane function (UPF) at the near edge of the edge portion of the 5G cellular network in response to detecting under-utilized computing resources at the far edge, components of the near edge being implemented on a first set of servers being located closer to the radio units of the RAN than a datacenter that hosts one or more components of the core network;

provision a far edge CU, a far edge UPF, and an edge compute workload at the far edge of the edge portion of the 5G cellular network, components of the far edge being implemented on a second set of servers being located closer to radio units of the RAN than the first set of servers of the near edge;

receive UE traffic at one or more distributed units on the second set of servers of the far edge, the UE traffic comprising edge compute traffic and non-edge compute traffic;

identify the edge compute traffic among the UE traffic;

route the edge compute traffic of the UE traffic to the edge compute workload on the second set of servers at the far edge;

route the non-edge compute traffic of the UE traffic to the near edge UPF on the first set of servers at the near edge;

consume telemetry of a current load at the far edge based on physical layer processing operations performed by one or more distributed units on the far edge;

detect, based on the telemetry, that the current load at the second set of servers at the far edge exceeds a first threshold level; and in response to determining that the current load at the second set of servers at the far edge exceeds the first threshold level:
cause the edge compute workload at the second set of servers at the far edge to be migrated to the first set of servers at the near edge; and deprovision the far edge CU, the far edge UPF, and the edge compute workload at the far edge.

20. The non-transitory computer readable medium of claim 19, wherein identifying the edge compute traffic comprises:
   identifying a destination Internet protocol (IP) address in data packets corresponding to an IP flow; and
   determining that the destination IP address corresponds to a far edge compute server from the second set of servers.

* * * * *